(12) United States Patent
Hayward et al.

(10) Patent No.: US 10,497,250 B1
(45) Date of Patent: Dec. 3, 2019

(54) REAL PROPERTY MONITORING SYSTEMS AND METHODS FOR DETECTING DAMAGE AND OTHER CONDITIONS

(71) Applicant: State Farm Mutual Automobile Insurance Company, Bloomington, IL (US)

(72) Inventors: Gregory L Hayward, Bloomington, IL (US); Meghan Sims Goldfarb, Bloomington, IL (US); Nicholas U. Christopulos, Bloomington, IL (US); Erik Donahue, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/136,501

(22) Filed: Sep. 20, 2018

Related U.S. Application Data

(60) Provisional application No. 62/652,121, filed on Apr. 3, 2018, provisional application No. 62/646,735, filed on Mar. 22, 2018, provisional application No. 62/646,740, filed on Mar. 22, 2018, provisional application No. 62/646,729, filed on Mar. 22, 2018, provisional application No. 62/632,884, filed on Feb. 20, 2018, provisional application No. 62/625,140, filed on Feb. 1, 2018, provisional application No. 62/622,542, filed on Jan. 26, 2018, provisional application No. 62/621,797, filed on Jan. 25, 2018, provisional application No. 62/621,218, filed on Jan. 24, 2018, provisional application No. 62/618,192, filed on Jan. 17, 2018, provisional application No.
(Continued)

(51) Int. Cl.
| | |
|---|---|
| G08B 25/01 | (2006.01) |
| G08B 23/00 | (2006.01) |
| G06Q 40/08 | (2012.01) |
| G06N 20/00 | (2019.01) |

(52) U.S. Cl.
CPC .......... *G08B 25/016* (2013.01); *G06N 20/00* (2019.01); *G06Q 40/08* (2013.01); *G08B 23/00* (2013.01)

(58) Field of Classification Search
CPC ....... G08B 25/016; G08B 23/00; G06Q 40/08
USPC ...................................................... 340/540
See application file for complete search history.

(56) References Cited

U.S. PATENT DOCUMENTS

| 7,149,347 B1 | 12/2006 | Wnek |
|---|---|---|
| 7,958,066 B2 | 6/2011 | Pinckney et al. |
| | (Continued) | |

*Primary Examiner* — John A Tweel, Jr.

(57) ABSTRACT

Machine learning systems, methods, and techniques for detecting damage and/or other conditions associated with a building, land, structure, or other real property using a real property monitoring system are disclosed. The property monitoring system is used in conjunction with machine learning techniques to determine and/or predict various conditions associated with the real property, including particular damage thereto, e.g., based upon dynamic characteristic data obtained via on-site sensors, static characteristic data, third-party input descriptive of an event impacting the building, etc. Accordingly, damage and/or loss associated with the building/real property is more quickly and/or accurately ascertained so that suitable mitigation techniques may be applied. In some scenarios, previously undetectable or uncharacterized damage and/or other conditions may be discovered and mitigated.

20 Claims, 13 Drawing Sheets

Related U.S. Application Data

62/617,851, filed on Jan. 16, 2018, provisional application No. 62/610,599, filed on Dec. 27, 2017, provisional application No. 62/580,655, filed on Nov. 2, 2017, provisional application No. 62/580,713, filed on Nov. 2, 2017, provisional application No. 62/564,055, filed on Sep. 27, 2017.

(56) References Cited

U.S. PATENT DOCUMENTS

| | | |
|---|---|---|
| 7,966,282 B2 | 6/2011 | Pinckney et al. |
| 8,595,037 B1 | 11/2013 | Hyde et al. |
| 9,684,933 B2 * | 6/2017 | Schumann, Jr. ........ G06Q 40/08 |
| 10,176,526 B2 * | 1/2019 | McLaughlin .......... G06Q 40/08 |
| 2010/0131304 A1 | 5/2010 | Collopy et al. |
| 2015/0235321 A1 | 8/2015 | Unser et al. |
| 2016/0117778 A1 | 4/2016 | Costello et al. |
| 2016/0267396 A1 | 9/2016 | Gray et al. |
| 2017/0161758 A1 | 6/2017 | Towriss |
| 2017/0185723 A1 | 6/2017 | McCallum et al. |

* cited by examiner

1000

Application for Real Property

Applicant Name: Seashore Properties, Inc.

Property Address: 123 Main Street, Seaside Town, North Carolina 12345

Year Built: 2000

Property Type: Single Family Home

Number of Stories: 3

Number of Full baths: 3

Number of ½ baths: 2

Square Footage: 2100

Exterior Wall Type: vinyl

Garage Type: None

Basement: None

Home Safety Devices/Fire/Theft Systems: connected home including security, home control and automation, energy management, and fire and water alerts Mortgages: Anybank, $150,000 balance

~1010

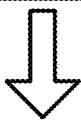

Labels

(RENTAL-PROPERTY, 1.0)

(BEACHFRONT, 1.0)

(RAISED STRUCTURE, 0.9)

(HURRICANESHUTTERS – 0.8)

(SECURITY-AUTOMATION-ENERGYMGMT- ALERTS – 0.75)

(BUILT POST-1998 COASTAL CODE – 0.75)

REAL PROPERTY MONITORING SYSTEMS AND METHODS FOR DETECTING DAMAGE AND OTHER CONDITIONS

CROSS-REFERENCE TO RELATED APPLICATIONS

This application claims priority to and the benefit of:

U.S. Prov. App. 62/564,055 filed Sep. 27, 2017 and entitled "REAL PROPERTY MONITORING SYSTEMS AND METHODS FOR DETECTING DAMAGE AND OTHER CONDITIONS;"

U.S. Prov. App. 62/580,655 filed Nov. 2, 2017 and entitled "AUTOMOBILE MONITORING SYSTEMS AND METHODS FOR DETECTING DAMAGE AND OTHER CONDITIONS;"

U.S. Prov. App. 62/610,599 filed Dec. 27, 2017 and entitled "AUTOMOBILE MONITORING SYSTEMS AND METHODS FOR DETECTING DAMAGE AND OTHER CONDITIONS;"

U.S. Prov. App. 62/621,218 filed Jan. 24, 2018 and entitled "AUTOMOBILE MONITORING SYSTEMS AND METHODS FOR LOSS MITIGATION AND CLAIMS HANDLING;"

U.S. Prov. App. 62/621,797 filed Jan. 25, 2018 and entitled "AUTOMOBILE MONITORING SYSTEMS AND METHODS FOR LOSS RESERVING AND FINANCIAL REPORTING;"

U.S. Prov. App. 62/580,713 filed Nov. 2, 2017 and entitled "REAL PROPERTY MONITORING SYSTEMS AND METHODS FOR DETECTING DAMAGE AND OTHER CONDITIONS;"

U.S. Prov. App. 62/618,192 filed Jan. 17, 2018 and entitled "REAL PROPERTY MONITORING SYSTEMS AND METHODS FOR DETECTING DAMAGE AND OTHER CONDITIONS;"

U.S. Prov. App. 62/625,140 filed Feb. 1, 2018 and entitled "SYSTEMS AND METHODS FOR ESTABLISHING LOSS RESERVES FOR BUILDING/REAL PROPERTY INSURANCE;"

U.S. Prov. App. 62/646,729 filed Mar. 22, 2018 and entitled "REAL PROPERTY MONITORING SYSTEMS AND METHODS FOR LOSS MITIGATION AND CLAIMS HANDLING;"

U.S. Prov. App. 62/646,735 filed Mar. 22, 2018 and entitled "REAL PROPERTY MONITORING SYSTEMS AND METHODS FOR RISK DETERMINATION;"

U.S. Prov. App. 62/646,740 filed Mar. 22, 2018 and entitled "SYSTEMS AND METHODS FOR ESTABLISHING LOSS RESERVES FOR BUILDING/REAL PROPERTY INSURANCE;"

U.S. Prov. App. 62/617,851 filed Jan. 16, 2018 and entitled "IMPLEMENTING MACHINE LEARNING FOR LIFE AND HEALTH INSURANCE PRICING AND UNDERWRITING;"

U.S. Prov. App. 62/622,542 filed Jan. 26, 2018 and entitled "IMPLEMENTING MACHINE LEARNING FOR LIFE AND HEALTH INSURANCE LOSS MITIGATION AND CLAIMS HANDLING;"

U.S. Prov. App. 62/632,884 filed Feb. 20, 2018 and entitled "IMPLEMENTING MACHINE LEARNING FOR LIFE AND HEALTH INSURANCE LOSS RESERVING AND FINANCIAL REPORTING," and U.S. Prov. App. 62/652,121 filed Apr. 3, 2018 and entitled "IMPLEMENTING MACHINE LEARNING FOR LIFE AND HEALTH INSURANCE CLAIMS HANDLING,"

the entire disclosures of which are hereby incorporated by reference herein in their entireties.

FIELD OF INVENTION

Machine learning methods facilitate loss mitigation and prevention, and the automation of the insurance claims handling process, as well as the customer experience.

BACKGROUND

As computer and computer networking technology has become less expensive and more widespread, more and more devices have started to incorporate digital "smart" functionalities. For example, controls and sensors capable of interfacing with a network may now be incorporated into devices such as appliances, security systems, light switches, and water valves, and other portions of building monitoring systems. Furthermore, it is possible for one or more central controllers to interface with the smart devices to facilitate monitoring, automation, and security applications for a building.

However, such systems may not be able to automatically detect and characterize various conditions associated with a building. For example, when sensors detect water in a basement of a building, such systems may not be able to automatically determine whether the water in the basement is due to an outside water main breaking and flooding the property, or whether a levee has been breached and the entire neighborhood is flooded. In another example, such monitoring systems may not be able to detect or sufficiently identify and describe damage that is hidden from human view, and that typically has to be characterized by explicit human physical exploration, such as damage between walls or in foundations, extent and range of electrical malfunctions, etc. Conventional systems further may not be able to formulate precise characterizations of loss without including unconscious biases, and may not be able to equally weight all historical data in determining loss mitigation factors.

SUMMARY

The present disclosure generally relates to systems and methods for detecting damage, loss, and/or other conditions associated with a building, land, structure, or other real property using a property monitoring system. The property monitoring system may be used in conjunction with machine learning techniques to facilitate loss mitigation and prevention, and the handling of an insurance claim, and enhancing the customer experience. Embodiments of exemplary systems and computer-implemented methods are summarized below. The methods and systems summarized below may include additional, less, or alternate components, functionality, and/or actions, including those discussed elsewhere herein.

In one aspect, a real property monitoring system may include a plurality of sensors fixedly disposed at respective locations at a building. Each sensor may monitor a respective dynamic, physical characteristic associated with the building, and at least some of the plurality of sensors may be fixedly attached to the building. The real property monitoring system may also include one or more user interfaces via which the real property monitoring system and end-users (e.g., residents, tenants, property owners, property managers, etc.) of the real property monitoring system communicate; one or more processors; and a data storage entity communicatively connected to the one or more processors, and storing dynamic characteristic data that is indicative of respective dynamic, physical characteristics detected by the plurality of sensors. The dynamic characteristic data may be generated based upon signals transmitted by the plurality of sensors, for example. Additionally, the real property monitoring system may include one or more network interfaces via which third-party input is received at the real property monitoring system. The third-party input may include digitized information that is descriptive of an event impacting the building, such as digital text, notes, images, etc. Typically, the third-party that or who has generated the contents of the third-party input is not an end-user of the real-property monitoring system.

Further, the real property monitoring system may include a damage detection module including a set of computer-executable instructions stored on one or more memories. The set of computer-executable instructions, when executed by the one or more processors, may cause the system to train, by utilizing the third-party input and the dynamic characteristic data corresponding to the building, an analytics model that is predictive of one or more conditions associated with the building. The system may apply the trained-analytics model to at least one of the dynamic characteristic data corresponding to the building or additional characteristic data corresponding to the building to thereby discover or predict at least one of the one or more conditions associated with the building. The one or more discovered conditions may include particular damage to the building that is associated with the event, e.g., particular damage to the building that is caused at least in part by the occurrence of the event, and optionally other conditions. An indication of the particular damage to the building (and any other discovered conditions corresponding to the building) may be transmitted by the real property monitoring system to at least one of a remote computing device or a user interface.

In another aspect, a computer-implemented method of detecting damage and other conditions at a building may include monitoring, using a plurality of sensors included in a real property monitoring system, a plurality of dynamic, physical characteristics associated with the building. The plurality of sensors may be fixedly disposed at respective locations at the building, and at least some of the plurality of sensors may be fixedly attached to the building. The method may include storing dynamic characteristic data that is indicative of the plurality of dynamic, physical characteristics associated with the building and monitored by the plurality of sensors. The dynamic characteristic data may be generated based upon signals transmitted by the plurality of sensors, and stored in a data storage entity included in the real property monitoring system, for example. Additionally, the method may include obtaining input whose content is generated by a third-party. The third-party input may include digitized or digital data that is descriptive of an event impacting the building, and may include note, text, images, and other types of digital data, and the third-party input may be obtained via a network interface of the real property monitoring system that is different than, or excluded from, a set of user interfaces via which end-users of the real property monitoring system (e.g., residents, tenants, property owners, property managers, etc.) communicate with the real-property monitoring system. Typically, the third-party that or who generates the content included in third-party input is not an end-user of the real-property monitoring system.

The computer-implemented method may further include training, by using the third-party input, the dynamic characteristic data of the building, and optionally other data, an analytics model that is predictive of one or more conditions associated with the building. The training may be performed, for example, by an information processor included in the real property monitoring system. The method may also include applying, e.g., by the information processor, the trained, analytics model to at least one of the dynamic characteristic data corresponding to the building or additional characteristic data corresponding to the building, thereby discovering or predicting at least one of the one or more conditions associated with the building, one of which may be particular damage to the building that is associated with the event. For instance, the occurrence of the event may have at least in part caused the particular damage to the building that has been discovered via the use of the trained analytics model. Other conditions associated with the building which may be discovered include, for example, a cause of loss corresponding to the event and/or to the particular damage, an adjustment to one or more terms of an insurance policy providing insurance coverage for the building, an adjustment to the pricing of a group of insurance policies, one of which provides insurance coverage for the building, and the like. The method may further include transmitting an indication of the particular damage to the building and/or or other discovered conditions to at least one of a remote computing device or a user interface.

In yet another aspect, a computer-implemented method of detecting and/or estimating damage may include receiving, e.g., via one or more processors and/or associated transceivers (such as via wired communication or data transmission, and/or wireless communication or data transmission over one or more radio links or communication channels), free form text or voice/speech associated with a submitted insurance claim for a damaged insured asset, where the damaged insured asset comprises a building. The method may also include identifying, e.g., via one or more processors, one or more key words within the free form text or voice/speech; and/or based upon the one or more keywords, determining, e.g., via one or more processors, a cause of loss and/or peril that caused damage to the damaged insured asset to facilitate handling an insurance claim, loss mitigation, and enhancing online customer experience.

In still another aspect, a computer-implemented method of determining damage to property may include inputting, e.g., via one or more processors, historical claim data into a machine learning algorithm to train the algorithm to identify one or more insured assets, respective types of the one or more insured assets, respective insured asset features or characteristics, one or more perils associated with the one or more insured assets, and/or respective repair or replacement costs of at least a portion of the one or more insured assets, wherein the one or more insured assets comprise a building or type of real property, such as a house or a home. The method may further include receiving, e.g., via the one or more processors and/or one or more transceivers (such as via wireless communication or data transmission over one or more radio links or communication channels), one or more images, such as digital images, of a damaged insured asset (such as digital or electronic images submitted by the insured via a webpage, website, and/or mobile device); and/or inputting, via one or more processors, the images of the damaged insured asset into a processor having the trained machine learning algorithm installed in a memory unit, where the trained machine learning algorithm identifies, based upon the input image(s), a type of the damaged insured asset, one or more features or characteristics of the damaged insured asset, a peril associated with the damaged insured asset, and/or a repair or replacement cost of at least a portion of the damaged insured asset to facilitate handling an insurance claim associated with the damaged insured asset, and damage mitigation and enhancing the customer experience.

In another aspect, a computer system configured to detect and/or estimate damage may include one or more processors, sensors, transceivers, and/or servers configured to receive (such as via wired communication or data transmission, and/or wireless communication or data transmission over one or more radio links or communication channels) free form text associated with a submitted insurance claim for a damaged insured asset, where the damaged insured asset comprises a building or another type of real property. The one or more processors, sensors, transceivers, and/or servers may be further configured to identify one or more key words included in the free form text; and/or based upon the one or more keywords, determine a cause of loss and/or peril that caused damage to the damaged insured asset to facilitate handling an insurance claim, mitigating damage, and enhancing online customer experience.

In yet another aspect, a computer system configured to determine damage to real property comprises one or more processors, servers, sensors, and/or transceivers configured to input historical claim data into a machine learning algorithm to train the algorithm to identify an asset (or type thereof), at least one feature or characteristic of the asset, a peril, and/or a repair or replacement cost of at least a portion of the asset, where the asset comprises real property. Additionally, the one or more processors, servers, sensors, and/or transceivers may be further configured to receive (such as via wired communication, and/or via wireless communication or data transmission over one or more radio links or communication channels), one or more images, such as digital images, of a damaged insured asset (such as one or more images submitted by the insured via a webpage, website, or mobile device); and/or input the one or more images of the damaged insured asset into a processor having the trained machine learning algorithm installed in a memory unit, where the trained machine learning algorithm identifies, e.g., based upon the one or more images, a type of the damaged insured asset, one or more features or characteristics of the damaged insured asset, a peril associated with the damaged insured asset, and/or a repair or replacement cost of at least a portion of the damaged insured asset to facilitate handling an insurance claim associated with the damaged insured asset, mitigating damage, and enhancing the customer experience.

In another aspect, a computer system configured to determine damage to real property comprises one or more processors, servers, sensors, and/or transceivers configured to input historical claim data into a machine learning algorithm to train the algorithm to develop a risk profile for an insurable asset based upon a type of the insurable asset and at least one feature or characteristic of the insurable asset, where the insurable asset comprises real property. The one or more processors, servers, sensors, and/or transceivers may also be configured to receive (such as via wired communication or data transmission, and/or wireless communication or data transmission over one or more radio links or communication channels), one or more images, such as digital image acquired via a mobile device or smart home controller, of an undamaged insurable asset (such as one or more images submitted by an insured party via a webpage, website, and/or mobile device); and/or input the one or more images of the undamaged insurable asset into a processor having the trained machine learning algorithm installed in a memory unit. Based upon the one or more images, the trained machine learning algorithm may identify or determine a risk profile for the undamaged insurable asset to facilitate generating an insurance quote for the undamaged insurable asset, mitigating and preventing damage, and enhancing the customer experience.

In still another aspect, a computer-implemented method for determining damage to real property may comprise, e.g., via one or more processors, servers, sensors, and/or transceivers, inputting, via the one or more processors, historical claim data into a machine learning algorithm to train the algorithm to develop respective risk profiles for at least one insurable asset based upon a type of the at least one insurable asset and at least one feature or characteristic of the at least one insurable asset. The at least one insurable asset may comprise real property such as a building, house, or home. The method may also include receiving, e.g., via the one or more processors and/or transceivers (such as via wired communication or data transmission, and/or via wireless communication or data transmission over one or more radio links or communication channels) one or more images, such as digital image acquired via a mobile device or smart home controller, of an undamaged insurable asset (such as one or more images submitted by an insured party via a webpage, website, and/or mobile device); and/or inputting, e.g., via the one or more processors, the one or more images of the undamaged insurable asset into a processor having the trained machine learning algorithm installed in a memory unit, where the trained machine learning algorithm, identifies or determines a risk profile for the undamaged insurable asset based upon the one or more images to facilitate generating an insurance quote for the undamaged insurable asset, damage mitigation and prevention, and enhancing the customer experience.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 10 depicts a flow diagram of an exemplary computer-implemented method of identifying risk indicators from real property information, according to one embodiment;

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Artificial Intelligence System for Homeowners Insurance

The present embodiments are directed to, inter alia, machine learning and/or training a model using historical home/property insurance claim data to discover risk levels and price home/real property insurance accordingly. Systems and methods may include natural language processing of free-form notes/text, or free-form speech/audio, recorded by call center and/or claim adjustor, photos, and/or other evidence. The free-form text and/or free-form speech may also be received from a customer who is inputting the text or speech into a mobile device app or into a smart home controller, and/or into a chat bot or robo-advisor.

Other inputs to a machine learning/training model may be harvested from historical claims may, and may include make, model, year of appliances in the house (e.g., water heater, toilet, dishwasher, etc.), type of home, materials used in building the home, claim paid or not paid, liability (e.g., types of injuries, where treated, how treated, etc.), disbursements related to claim such as hotel costs and other payouts, etc. Additional inputs to the machine learning/training model may include home telematics data received from a smart home controller, such as how long and when are the doors unlocked, how often is the security system armed, how long is the stove on and during which times of the day, etc.

The present embodiments may facilitate discovering new causes of loss that may be utilized to set pricing of insurance. Causes of loss for homeowners may include wind, hail, fire, mold, etc. The present embodiments may dynamically characterize insurance claims, and/or dynamically determine causes of loss associated with insurance claims, which may vary geographically. The present embodiments may dynamically update pricing models to facilitate better matching insurance premium price to actual risk.

Exemplary Real Property Monitoring System for Detecting Damage

Figure 1:
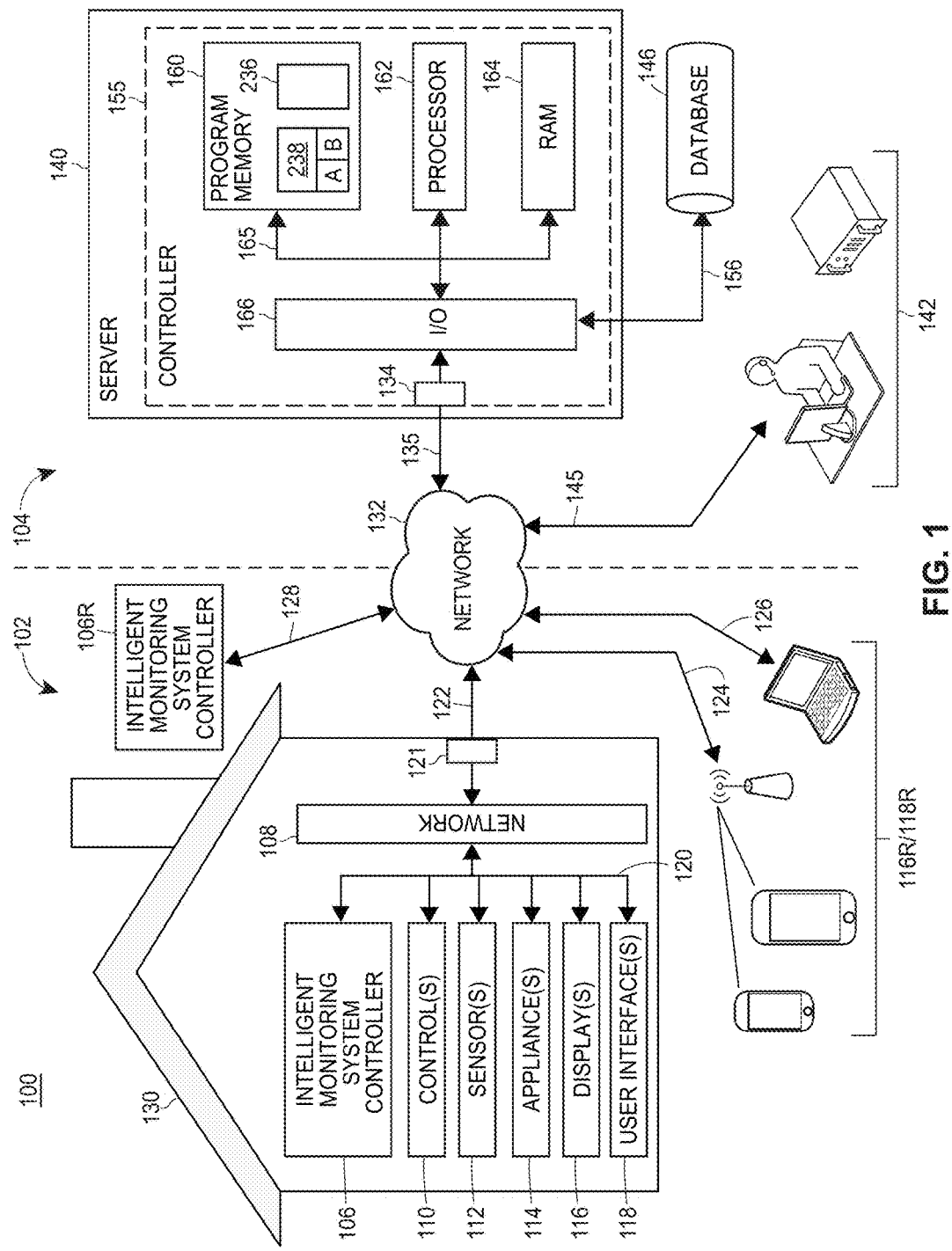
FIG. 1 illustrates a block diagram of an exemplary real property monitoring system for detecting damage and/or loss associated with a building, structure, land, and/or other real property that may operate in accordance with the described embodiments.

FIG. 1 illustrates a block diagram of an exemplary real property monitoring system 100. The high-level architecture includes both hardware and software applications, as well as various data communications channels for communicating data between the various hardware and software components. Generally, the real property monitoring system 100 may automatically monitor conditions and/or characteristics (which may be dynamically occurring) of a building, structure, land, and/or other type of real property, e.g., any designated portion of land and/or anything permanently placed on or under the designated portion of land.

The real property monitoring system 100 may be roughly divided into front-end components 102 and back-end components 104. The front-end components 102 may be disposed within, on, or at a physical real property, such as within, on, or at a residential or non-residential building 130. For example, the exemplary real property monitoring system 100 may be installed in, or at, a single-family house, an apartment building, or a condominium, or even in or at a non-residential location, such as business, warehouse, school, government building, museum, etc. For ease of reading and illustration herein, the system 100 is described as monitoring a building 130, however, it is understood that the system 100 and/or any of the techniques, methods, apparatuses, and/or devices described herein may be easily applied to other types of real property.

Further, while some of the exemplary front-end components 102 are described as being disposed within or inside the building 130, it is understood that some or all of the front-end components 102 may be installed outside of or nearby the building 130. For example, one or more front-end components 102 may be fixedly attached to the interior and/or the exterior of the building 130, and/or fixedly attached to respective supports or fixtures that are located on the particular portion of land or real estate on which the building 130 is situated. Additionally or alternatively, one or more front-end components 102 may be removably attached to the interior and/or the exterior of the building 130, and/or removably attached to respective supports or fixtures that are located on the particular portion of land or real estate on which the building 130 is situated.

Generally speaking, as used herein, one or more front-end components 102 that are installed "at" a building 130 may be disposed inside, outside, around, and/or nearby the building 130. Further still, in one embodiment, one or more of the front-end components 102 may be disposed at a location that is remote from the building 130. For example, the remote intelligent monitoring system controller 106R may be located remotely from the building 130 and communicatively connected with other front-end components 102, e.g., via the network 132. Generally, though, the front-end components 102 are positioned and/or located so that the system 100 is able to monitor conditions at the building 130.

The real property monitoring system 100 may include an intelligent monitoring system controller 106, one or more control devices 110, one or more sensors 112, one or more appliances 114, one or more displays 116, and/or one or more user input devices or user interfaces 118, which are collectively referred to herein as "intelligent building products." Typically, but not necessarily, the real property monitoring system 100 may include multiples of the intelligent building products 110, 112, 114, 116, and/or 118. For example, the real property monitoring system 100 may include a plurality of control devices 110, a plurality of sensors 112, a plurality appliances 114, a plurality of displays 116, and/or a plurality of user interfaces 118. In some arrangements (not shown), the front-end components 102 may also include a back-up power supply (e.g., battery, uninterruptable power supply, generator, etc.).

The front-end components 102 may be connected to each other via one or more links 120 and/or may be connected to a monitoring system network 108 by the link(s) 120. The one or more links 120 may include at least one of a wired connection, a wireless connection (e.g., one of the IEEE 802.11 standards), an optical connection, etc. In certain embodiments in which the real property monitoring system 100 may include a remote intelligent monitoring system controller 106R, the remote intelligent monitoring system controller 106R may be communicatively connected to the monitoring system network 108 via another network 132 and the data and/or communication links 122, 128, as is described in more detail in a later section below.

Exemplary Block Diagram of Real Property Monitoring System

Figure 2:
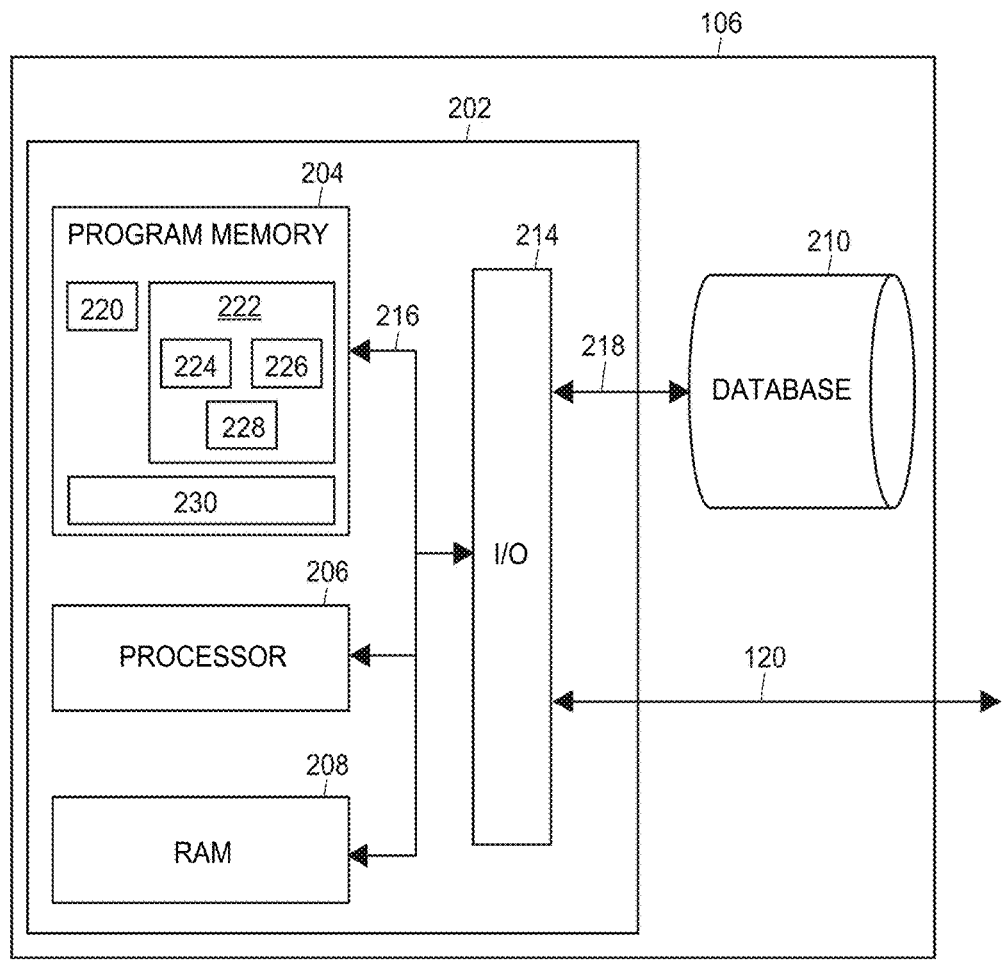
FIG. 2 illustrates a block diagram of an exemplary real property monitoring system controller which may be included in the system of FIG. 1.

FIG. 2 illustrates a more detailed block diagram of the exemplary intelligent monitoring system controller 106 of FIG. 1. The intelligent monitoring system controller 106 may include a controller 202 that is operatively connected to a database 210 via a link 218. It should be noted that, while not shown, additional databases may be linked to the controller 202 in a known manner. Additionally, the controller 202 may include a program memory 204, a processor 206 (may be called a microcontroller or a microprocessor), a random-access memory (RAM) 208, and an input/output (I/O) circuit 214, all of which may be interconnected via an address/data bus 216. It should be appreciated that although only one microprocessor 206 is shown, the controller 202 may include multiple microprocessors 206. Similarly, the memory of the controller 202 may include multiple RAMs 208 and multiple program memories 204. Further, although the I/O circuit 214 is shown as a single block, it should be appreciated that the I/O circuit 214 may include a number of different types of I/O circuits. The program memory 204 and/or the RAM 208 may include or store a graphical user interface 220 and an intelligent monitoring system application 222, for example.

The graphical user interface 220 may include a set of computer-readable or computer-executable instructions that, when executed by the processor 206, cause the display(s) 116/116R and the user input device(s) or user interface(s) 118/118R to display information, e.g., to an end-user, and/or to receive input from the end-user. As used herein, the term "end-user" refers to a user or operator of the real property monitoring system 100 who uses the building 130 and/or is responsible, at least in part, for the condition and/or safety of and associated with the building 130. There may be more than one user or operator of the real property monitoring system 100 (e.g., a family, a staff of people, etc.). Further, the set of end-users of the real property monitoring system 100 associated with the building 130 may include a primary user (e.g., the owner of the building 130, a tenant of the building 130, a property manager of the building 130, or the person under whose name the monitoring account is held for the building 130) and one or more authorized secondary users (e.g., a personal assistant of the primary user, a dependent child of the primary user, employees of a tenant the building, etc.).

End-users may communicate with the real property monitoring system 100 via a local user interface that is disposed at the building 130 (e.g., devices 116, 118). For example, the local user interfaces 116, 118 may include panels, touchscreens, etc. that are fixedly attached at various locations inside of the building and/or at various proximate locations external to the building, such as on the parcel of land or real estate on which the building is located. Additionally or alternatively, end-users may communicate with the real property monitoring system 100 via a remote user interface (e.g., devices 116R, 118R), such as a mobile or smart device, laptop, tablet, or the like, which may be physically disposed (e.g., when ported by the end-user) inside the building or at some other remote location.

It is noted that, in some implementations, a local display 116 and a local user interface 118 may be an integral device, and/or a remote display 116R and a remote user input device 118R may be another integral device. For example, the monitoring system 100 may include one or more intelligent building control panels that are fixedly disposed within or at the building 130, such as a downstairs building control panel and an upstairs intelligent building control panel, and/or may include one or more control panels that are implemented on one or more mobile devices via which end-users may utilize to communicate with the system 100.

Such local and/or remote control panels may respectively include, for example, a display and/or input product (e.g., a touchscreen) and may perform the functions of an intelligent monitoring system controller 106 as described above. For example, such an intelligent building control panels may be used to receive user input to the real property monitoring system 100 as described above, and/or to display statuses, alerts, and/or alarms to the end-user.

The intelligent monitoring system application 222 may include a set of computer-executable or computer-readable instructions that, when executed by the processor 206, cause the intelligent monitoring system controller 106 to carry out one or more of the functions associated with the real property monitoring system 100 described herein. Various functions of the real property monitoring system 100 may be implemented by one or more respective operating modules included in the intelligent monitoring system application 222, which may be implemented as one or more software applications and/or one or more software routines (e.g., computer-executable instructions that are stored on the memory 204 and that are executable by the processor 206). For example, a monitoring module or local monitor 224 may implement functionality for monitoring one or more dynamic, physical characteristics and/or conditions of the building 130, and a damage detection module or damage detector 226 may implement functionality for determining and/or detecting damage, loss, and/or other conditions associated with the building 130. More detailed descriptions of the local monitor 224 and of the damage detector 226 are provided in other sections of this disclosure.

Of course, the intelligent monitoring system application 222 may not be limited to including only the local monitor 224 and the damage detector 226, and may include one or more other modules 228 to implement desired functionality. Similarly, the program memory 204 may store one or more applications 230 other than the graphical user interface 220 and the intelligent monitoring system application 222 as desired. Further, in some implementations, some or all of the operating modules, applications, or portions thereof may be stored in the back-end components 104 and implemented by the back-end components 104, or on another instance of another controller 106 associated with the building 130, which may be the remote controller 106R or another controller (not shown). In a non-limiting example, the monitoring module 224 may be included in the controller 106 at the building 130, while the damage detection module 226 may be included in the controller 106R that is remotely situated from the building 130.

The RAM(s) 208 and program memories 204 of the controller 202 may be implemented as one or more non-transitory, tangible computer-storage media, such as one or more semiconductor memories, magnetically readable memories, biological memories, and/or optically readable memories, for example. The controller 202 may further include and/or may communicatively connect (e.g., via the link 218) to one or more databases 210 or other data storage mechanisms or entities 210 (e.g., one or more hard disk drives, optical storage drives, solid state storage devices, etc.), which may include one or more respective non-transitory, tangible computer-storage media.

In one embodiment, at least one of the data storage entities 210 is local to the controller 202 and, in some implementations, may be included with the controller 202 in an integral device. In another embodiment, at least some of the data storage entities 210 may be located or disposed remotely from the controller 202, but nonetheless may be communicatively connected to the controller 202, e.g., via the network 108 and optionally the network 132. For example, at least a portion of the data storage entities 210 may be implemented as a remote data bank or data cloud storage. It is noted that although more than one data storage entity 210 may be included in the real property monitoring system 100, for ease of reading, the data storage entities 210 are referred to herein using the singular tense, e.g., the database 210 or the data storage entity 210.

At any rate, the database 210 may be adapted to store data related to the operation of the real property monitoring system 100. Such data might include, for example, telematics data collected by the intelligent monitoring system controller 106 from the intelligent building products 110, 112, 114, 116, 118 pertaining to the real property monitoring system 100 such as sensor data, power usage data, control data, input data, other data pertaining to the usage of the intelligent building products, user profiles and preferences, and/or other types of data. Generally speaking, the data stored in the database 210 may include time-series data, where each time-series data value is associated with a respective timestamp or other suitable indication of a particular time at which the data value was collected and/or stored. The intelligent monitoring system controller 106 may access data stored in the database 210 when executing various functions and tasks associated with the operation of the real property monitoring system 100.

The intelligent monitoring system controller 106 may use the monitoring application 222 to receive and process data that is generated by the intelligent building products 110, 112, 114, 116, 118. For example, data indicative of sensed conditions may be transmitted from the sensors 112 to the monitoring application 220, which may then store the received data, process the received data (e.g., in conjunction with other data received from other intelligent building products), and take any resulting actions based upon the processed data, such as activating alarm, notifying an end-user, controlling another intelligent building product or component of the building 130, etc.

The intelligent monitoring system controller may use the graphical user interface 220 to provide, e.g., on the display 116 and/or on the remote display 116R, information based upon the data received from the intelligent building products 110, 112, 114, 116/116R, 118/118R. For example, the intelligent monitoring system controller 106 may be configured to provide with the display 116 and/or remote display 116R the state of one or more control devices 110 (e.g., whether a light is on or off), a reading from a sensor 112 (e.g., whether water has been detected in the basement), the state of or a reading from an appliance 114 (e.g., whether the stove is on), etc. Additionally, or alternatively, the intelligent monitoring system controller 106 may use the graphical user interface 220 to provide, e.g., on the display 116 and/or remote display 116R, with alerts generated from the data received from the intelligent building products 110, 112, 114, 116, 118 such as, for example, a security system alert, a fire alert, a flooding alert, power outage alert, etc.

The end-user may acknowledge the information provided, disable alerts, forward an alert to a monitoring service and/or to authorities, adjust the state of a control device 110, adjust the state of an appliance 114, etc. using the display 116 and/or remote display 116R in conjunction with an input device 118 and/or remote input device 118R. For example, an end-user may receive an alert that the security system in the building 130 has been activated on the user's smartphone. Using his or her smartphone, the end-user may disable the alert or forward the alert to a monitoring service or to local authorities. In another example, an end-user may use his or her tablet computer to check to see if s/he remembered to turn off the stove. The tablet computer may access the intelligent building controller 106 over the network 132 to query the current state of the stove. If s/he sees that the stove is on, s/he may input a command on the tablet computer to deactivate the stove. Of course, it will be understood that the foregoing are but two examples.

Alternatively or additionally, the intelligent monitoring system controller 106 may send the information based upon the data received from the intelligent building products 110, 112, 114, 116, 118 to the server 140 over the network 132, and the server 140 may be configured to provide the information with the display 116 and/or remote display 116R. In such cases, the server 140 may act as a middleman between the intelligent building controller 106 and the display 116 and/or remote display 116R.

Referring again to FIG. 1, as an alternative to or in addition to the intelligent monitoring system controller 106, a remote intelligent monitoring system controller 106R may be used to replace or augment the functions of the intelligent monitoring system controller 106. The remote intelligent monitoring system controller 106R may be a computer system or server connected to the network 132 by one or more data and/or communications links 128, and may generally have an architecture similar to that of the intelligent monitoring system controller 106 shown in FIG. 2. Further, in one embodiment, the remote intelligent monitoring system controller 106R may be implemented using distributed processing or "cloud computing" where the functions of the remote intelligent monitoring system controller 106R are performed by multiple computers or servers connected to the network 132. In one embodiment, the remote intelligent monitoring system controller 106R may be implemented in one or more servers 140 included in the back-end components 104 or in a similar server arrangement included in the front-end components 102.

Again referring to FIG. 1, a control device 110 may be any of a number of devices that allow automatic and/or remote control of components or systems at the building 130. For example, the control device 110 may be a thermostat that can be adjusted according to inputs from the intelligent monitoring system controller 106 to increase or decrease the temperature in the building 130. Such a thermostat may control the temperature in a room and/or the entire building 130. The control device 110 may also be a light switch that can be adjusted according to inputs from the intelligent monitoring system controller 106 to turn on, turn off, brighten, and/or dim lights in the building. Such light switches may be coupled to all the lights in a room and/or an individual light fixture.

The control device 110 may be an automated power outlet that can be adjusted according to inputs from the intelligent monitoring system controller 106 to apply power and/or remove power from an outlet. Such an automated power outlet may, for example, allow for remote turning off of a television that was left on with a user command, automatic turning off of an electric stove that was left on after a threshold amount of time has elapsed since motion was detected in the building 130, automatic turning on of a lamp when motion is detected in the room, etc.

Similarly, the control device 110 may be an automated circuit breaker that can be adjusted according to input from the intelligent monitoring system controller 106 to automatically and/or remotely apply or remove power to the entire building 130. The control device 110 may be an automated water valve that can be adjusted according to inputs from the intelligent monitoring system controller 106 to adjust the flow of water in and around the building 130 (e.g., turning on or turning off sprinklers, turning on a pump to prevent the basement from flooding, etc.).

The control device 110 may be an automated gas valve that can be adjusted according to input from the intelligent monitoring system controller 106 to adjust the flow of gas in and around the building 130. Such an automated gas valve may, for example, allow for automatic and/or remote shutting off of gas during a fire or earthquake, etc. Of course, other control devices 110 may be included in the real property monitoring system 100.

The sensor 112 may be any of a number of sensors that may gather information about conditions in or around the building 130 and/or activities in or around the building 130. That is, one or more sensors 112 may monitor respective dynamic, physical characteristics and/or conditions associated with the building 130 and/or its internal and/or external environment. For example, the sensor 112 may be a smoke detector which may send an input to the intelligent monitoring system controller 106 indicating the presence of smoke in the building 130. The sensor 112 may also be a part of the thermostat discussed above which may send input to the intelligent monitoring system controller 106 indicating the temperature in the building 130.

The sensor 112 may be a water sensor which may send input to the intelligent monitoring system controller 106 indicating, for example, the flow rate of a faucet, the presence of water in the basement, a roof leak in the attic, whether the sprinkler system is turned on, etc. The sensor 112 may be an energy monitor which may measure the power usage of a light fixture, an appliance, an entire room, the entire building 130, etc.

The sensor 112 may be any of a number of security sensors. Such security sensors may include motion sensors, door sensors (to detect the opening, closing, and/or breaking of a door), window sensors (to detect the opening, closing, and/or break of a window), etc. The sensor 112 may be a camera and/or a microphone which may send visual and/or audible input to the intelligent monitoring system controller 106.

The appliance 114 may be any of a number of appliances that may be present in the building 130 and communicating with the intelligent monitoring system controller 106. Each appliance 114 may be a "smart" appliance. For example, the appliance 114 may have an integrated computer system that helps to optimize the operation of the appliance 114. Such an integrated computer system may assist, for example, with scheduling usage of the appliance (e.g., a smart dishwasher that will wait to run the dishwashing cycle until off-peak hours), sending usage reports to the intelligent monitoring system controller 106, sending sensor data to the intelligent monitoring system controller 106, receiving commands from the intelligent monitoring system controller 106, etc.

An appliance 114 may be a refrigerator, dishwasher, a washing machine, a dryer, an oven, a stove, a microwave, a coffeemaker, a blender, a stand mixer, a television, a video game console, a cable box or digital video recorder, an air conditioning unit or system, a dishwasher, etc. Additionally, an appliance 114 may also be a household robot (e.g., a robotic vacuum cleaner).

The display 116 may be any of a number of visual and/or audible output devices that may be used to display output from the intelligent monitoring system controller 106. Such output may include sensor readings, alert messages, reports on the usage of various system in the building (e.g., electricity, water, etc.), a list of supplies to purchase (e.g., a smart refrigerator has reported that the milk and eggs are running out and recommends to purchase some of each), video or images from a camera, a user interface operating in conjunction with the input device 118, etc. The display 116 may also display data generated outside the building 130, such as information about weather conditions, public safety announcements, sports scores, advertisements, television channels, videos, etc.

The display 116 may be a monitor (e.g., an LCD monitor, a CRT monitor), a television, a screen integrated into a control panel of the intelligent monitoring system controller 106, a screen integrated into an appliance 114, etc. The display 116 may be used to present a graphical user interface 220 with which the end-user can interact with the intelligent monitoring system controller 106. Additionally, the display 116 may also include or be connected to speakers (not shown). Such speakers may be used to present information from the intelligent monitoring system controller 106, for example, in connection with the graphical user interface 220, an audible alert, etc.

The display 116 may also be a display that is remote from the building 130. The display 116 may be a remote display 116R (e.g., a smartphone, tablet computer, or personal computer, etc.) that sends and receives information over the network 132 over one or more wireless connections or links 124 (e.g., a cellular network connection, an 802.11 connection, and/or other type of data or communications connection or link), and/or over one or more wired data and/or communications connections or links 126.

The remote display 116R may include a user interface to display information about the intelligent monitoring system to a user via an application installed on the smartphone, tablet computer, or laptop computer. The remote display 116R may receive information from the intelligent monitoring system controller 106 and display information about one or more of the control device 110, sensor 112, appliance 114, display 116, or input device 118. For example, a user may use the application on his smartphone to receive an alert from the intelligent monitoring system controller 106 over the wireless connection(s) 124. Of course, it will be understood that devices other than a smartphone, tablet computer, or personal computer may be a remote display 116R.

The input device or user interface 118 may be any of a number of input devices or user interfaces that may be used to input data and/or commands to the intelligent monitoring system controller 106. For example, the input device 118 may be a keyboard, mouse, remote control, etc. The input device 118 may also be integrated with the display 116, for example, as a touchscreen. The input device 118 may also be a microphone which can receive verbal commands from a user. The input device 118 may be used to receive commands in connection with the graphical user interface 220, the intelligent monitoring system application 222, and/or any other applications or routines associated with the exemplary real property monitoring system 100.

The input device 118 may be a remote input device 118R (e.g., a smartphone, tablet computer, or personal computer, etc.) that sends and receives information over the network 132 over one or more wireless connections 124 (e.g., a cellular network connection, an 802.11 connection, and/or another type of wireless, data and/or communications connection or link), and/or over one or more wired connections or links 126. The remote input device 118R may receive user input via an application installed on the smartphone, tablet computer, or laptop computer that may present a user interface to display information about the intelligent building system and receive user input. The remote input device 118R may send commands (e.g., activate, deactivate, toggle, etc.) to the intelligent monitoring system controller 106 to affect one or more of the control device 110, sensor 112, appliance 114, display 116, or input device 118. For example, a user may use the application on his smartphone to turn off his stove over the wireless connection(s) 124. Of course, it will be understood that devices other than a smartphone, tablet computer, or personal computer may be a remote input device 118R.

The front-end components 102 may communicate with the back-end components 104 via the network 132. For example, the intelligent monitoring system products 106-118 situated at the building 130 may be communicatively connected to the network 132 via the network 108 and one or more network interfaces 121 supporting one or more data and/or communication links 122. The one or more links 122 may include one or more wired communication or data links and/or one or more wireless communication or data links, and as such, the one or more network interfaces 121 may include one or more physical ports and/or one or more wireless transceivers. The remote products 106R, 116R, 118R may be similarly connected to the network 132 over respective data and/or communication links 124, 126, and 128.

The network 132 may include one or more proprietary networks, the public Internet, one or more virtual private networks, or some other type of network, such as dedicated access lines, plain ordinary telephone lines, satellite links, data links, communications links, combinations of these, etc. Where the network 132 comprises an internet (either private and/or public), data communications may take place over the network 132 via an Internet communication protocol.

The back-end components 104 may include a server 140. The server 140 may include one or more computer processors adapted and configured to execute various software applications and components of the real property monitoring system 100, in addition to other software applications. Although the server 140 is depicted in FIG. 1 as being a single computing device, it is understood that the server 140 may logically be implemented using multiple computing devices, such as a server bank or a computing cloud.

Similarly to the intelligent monitoring system controller 106, the server 140 may have a controller 155 that is operatively connected to a database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165.

It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits.

The RAM(s) 164 and program memories 160 may be implemented as semiconductor memories, magnetically readable memories, biologically readable memories, and/or optically readable memories, for example. The controller 155 may also be operatively connected to the network 132 via one or more network interfaces 134 supporting one or more data and/or communications links 135, which may include any number of wireless and/or wired communication or data links. As such, the one or more network interfaces 134 may include one or more physical ports and/or one or more wireless transceivers.

The server 140 may include and/or may be communicatively connected to (e.g., via the link 156) to one or more databases 146 or other data storage mechanisms or entities 146 (e.g., one or more hard disk drives, optical storage drives, solid state storage devices, etc.), which may comprise one or more respective, non-transitory, tangible computer-storage media. In one embodiment, at least one of the data storage entities 146 is local to the controller 155 and, in some implementations, may be included with the controller 155 in an integral device.

In one embodiment, at least one of the data storage entities 146 may be located or disposed remotely from the controller 155, but nonetheless may be communicatively connected to the controller 155, e.g., via the network 132.

For example, at least a portion of the data storage entities 146 may be implemented as a remote data bank or data cloud storage. It is noted that although more than one data storage entity 146 may be included in the intelligent monitoring system 100, for ease of reading herein, the data storage entities 146 are referred to herein using the singular tense, e.g., the database 146 of the data storage entity 146.

The database 146 may be adapted to store data related to the operation of the real property monitoring system 100. Such data might include, for example, telematics data collected by the intelligent monitoring system controller 106 pertaining to the real property monitoring system 100 and uploaded to the server 140, such as data pertaining to the usage of the intelligent building products, data pertaining to third-party input and its processing (e.g., by the information processor 226), data pertaining to detected damage associated with real property, user and/or customer profiles, information about various intelligent building products that are available for installation, web page templates and/or web pages, or other kinds of data. The server 140 may access data stored in the database 146 when executing various functions and tasks associated with the operation of the real property monitoring system 100.

As shown in FIG. 1, the program memory 160 and/or the RAM 164 may store various applications for execution by the microprocessor 162. For example, a user-interface application 236 may provide a user interface to the server 140. The user interface application 236 may, for example, allow a network administrator to configure, troubleshoot, or test various aspects of the server's operation, or otherwise to access information thereon.

A server application 238 operates to transmit and receive information from one or more intelligent monitoring system controllers 106 on the network 132. The server application 238 may receive and aggregate alerts and usage data, and forward alerts to a remote system monitor 142, e.g., via one or more data and/or communication links 145. The server application 238 may be a single module 238 or a plurality of modules 238A, 238B. While the server application 238 is depicted in FIG. 1 as including two modules, 238A and 238B, the server application 238 may include any number of modules accomplishing tasks related to implantation of the server 140.

By way of example, the module 238A may populate and transmit the client application data and/or may receive and evaluate inputs from the end-user to receive a data access request, while the module 238B may communicate with one or more of the back-end components 104 to fulfill a data access request or forward an alert to a remote system monitor 142. In one embodiment, at least a portion of or the entire monitoring module 224 of FIG. 2 may be included in the server application 238 (not shown). Additionally or alternatively, at least a portion of or the entire damage detection module 226 of FIG. 2 may be included in the server application 238 (also not shown).

Additionally, the back-end components 104 may further include the intelligent, remote monitoring system monitor 142. The remote system monitor 142 may be a human monitor and/or a computer monitor as shown in FIG. 1. The remote system monitor 142 may receive data from the server 140 and/or the front-end components 102 over the network 132, e.g., via the link(s) 145, which may comprise any number of wired and/or wireless data and/or communications links. Such data may include information from and/or about the intelligent building controller 106, control device 110, sensor 112, appliance 114, display 116, and/or input device 118.

The remote system monitor 142 may also receive this information indirectly (e.g., the server 140 may forward information to the remote system monitor 142, the end-user may forward alerts to the remote system monitor 142 with an input device 118 or remote input device 118R). If the remote system monitor 142 receives information indicating an event potentially requiring an appropriate responder or authority (e.g., law enforcement for a security alert, fire department for a fire alert, paramedics for a medical alert, plumber for a leak alert, power company for a power outage alert, etc.), the remote system monitor 142 may attempt to contact one of the authorized end-users (e.g., with a telephone call, text message, email, app alert, etc.) to verify the event potentially requiring an appropriate responder and/or notify the appropriate responder. For example, the remote system monitor 142 may receive information from a smoke detector (i.e., a sensor 112) indicating that the building 130 may be ablaze.

The remote system monitor 142 may then attempt to contact the end-user to ascertain the severity of the fire and ask if the fire department should be called. If none of the end-users answer or if an end-user requests that the fire department be notified, the remote system monitor 142 may contact the fire department and provide the fire dispatch with information about the building 130 (e.g., address, number of residents, configuration of building, etc.) and/or information about the fire (e.g., smoke detected in four rooms of the house).

In another example, the remote system monitor 142 may receive information from water valve (i.e., a control 110) indicating that the valve is open and may also receive information from a water sensor (i.e., a sensor 112) indicating that the basement has begun to flood. The remote system monitor 142 may attempt to contact one of the authorized end-users to notify the user and ask if remote closing of the water valve and/or calling a plumber is requested. If none of the end-users answer, or if the user responds in the affirmative, the remote system monitor 142 may close the water valve and/or call a plumber to prevent further flooding of the basement. It may be advantageous to call the appropriate responder without first attempting to contact end-users (e.g., if the user has indicated he or she will be out of the country or in the wilderness).

Although the real property monitoring system 100 is shown to include one server 140, one remote system monitor 142, one building 130, one intelligent monitoring system controller 106, one control device 110, one sensor 112, one appliance 114, one display 116, and one input device 118, it should be understood that different numbers of servers 140, monitors 142, buildings 130, intelligent monitoring system controllers 106, control devices 110, sensors 112, appliances 114, displays 116, and input devices 118 may be utilized. For example, the system 100 may include a plurality of servers 140 and hundreds of buildings 130, all of which may be interconnected via the network 132.

Further, each building 130 may include more than one of each of an intelligent monitoring system controller 106, a control device 110, a sensor 112, an appliance 114, a display 116, and an input device 118. For example, a large building 130 may include two intelligent monitoring system controllers 106 that are connected to multiple control devices 110, multiple sensors 112, multiple appliances 114, multiple displays 116, and/or input devices 118.

Additionally several buildings 130 may be located, by way of example rather than limitation, in separate geographic locations from each other, including different areas of the same city, different cities, or different states. Furthermore, the processing performed by the one or more servers 140 may be distributed among a plurality of servers in an arrangement known as "cloud computing." According to the disclosed example, this configuration may provide several advantages, such as, for example, enabling near real-time uploads and downloads of information as well as periodic uploads and downloads of information.

Turning now in particular to the local monitor 224 and the damage detector 226, as previously discussed, at least a portion of each of these components may be included in the front-end components 102 (e.g., in the controller 106 and/or the controller 106R), and/or at least a portion of each of these components may be included in the back-end components 104 (e.g., in the server 140). In one embodiment, for example, a first portion of one of the components 224, 226 may be included in the front-end components 102, while another portion of the one of the components 224, 226 may be included in the back-end components 104. In one embodiment, for example, the entirety of one of the components 224, 226 (e.g., the local monitor 224) may be included in the front-end components 102, and the entirety of another one of the components 224, 226 (e.g., the damage detector 226) may be included in the back-end components 104. Of course, other arrangements may be possible.

The local monitor 224 may implement functionality for monitoring one or more dynamic, physical characteristics and/or conditions associated with the building 130, e.g., of the building 130 and/or of its internal and/or external environment. As illustrated in FIG. 1, the local monitor 224 may be communicatively connected to one or more intelligent building products, e.g., one or more control devices 110, one or more sensors 112, one or more appliances 114, one or more displays 116, one or more user interfaces 118, etc., and data generated by the intelligent building products 110-118 may be transmitted to the local monitor 224.

Generally speaking, but not necessarily, data generated by the intelligent building products 110-118 may be time-series data where each data point includes a value and a corresponding indication of time at which the value was collected, observed, or generated by the respective intelligent building product. Control devices 110 may generate data indicative of changes of state of various devices at the building 130, such as on/off, opened/closed, degree or amount (e.g., of temperature for thermostat, of amount of light for a light dimmer, of airflow for a fan, etc.), and/or other changes of state of the various devices. Additionally or alternatively, control devices 110 may generate data indicative of a control command that changed a device state, e.g., manual or automatic adjustment of a thermostat, turning sprinklers on and off, etc. Sensors 112 may generate data indicative of a sensed characteristic or condition such as, for example, motion, heat, light, water, smoke, etc.

Generally speaking, sensors 112 detect or sense various dynamic characteristics and/or conditions of the building 130 and/or of its internal and/or external environment, and in some cases, a degree or amount of the dynamic characteristic (e.g., temperature, flow, density, etc.). Appliances 114 may generate data that is indicative of the operation of the appliances 114, such as usage reports, appliance sensor data, and the like. Additionally or alternatively, appliances 114 may generate data indicative of a received command, such as a manual or automatic command to turn a particular appliance on or off, to adjust a control on the appliance, etc.

Displays 116 and/or user interfaces 118 may generate data indicative of user input and/or responses that are received. Generally speaking, dynamic characteristics of the building 130 that are monitored by the intelligent building products 110, 112, 114, 116/116R, 118/118R may be indicative of the usage of the building 130, and/or of the usage and/or operations of components and various systems (e.g., appliances, security system, smart utility systems, HVAC systems, communication network systems, etc.) that are included in and that service the building 130.

At any rate, the local monitor 224 may receive data generated by the intelligent building products 110-118 (e.g., data descriptive of various dynamic characteristics of and/or associated with the building 130) and may store the received data into the database 210 and/or the database 146. In some scenarios, the local monitor 224 may process the data generated by the intelligent building products 110-118 to determine one or more current conditions associated with the building 130, and optionally one or more resulting actions in response to the determined conditions. For example, alerts or alarms may be sent to the remote system monitor 142 based upon data generated by motion detectors, smoke detectors, etc.

Additionally or alternatively, a user may be notified of a detected condition, e.g., via a display 116 or user interface 118 at the building 130, and/or via a remote device 116R/118R. Other actions may be possible. The local monitor 224 may store determined and/or detected conditions and/or any resulting actions into the database 210 and/or the database 146, e.g., as time-series data.

The damage detector 226 may also implement functionality for receiving and data processing third-party input or data, and utilizing such data to detect or determine damage and/or other conditions associated with the building 130. Third-party input or data may include digitized information, such as digital images, notes, text, numbers, and/or data of any suitable digital format.

Typically, the content of third-party input or data is generated by a party that or who is not an end-user (e.g., owner, property manager, resident, staff, etc.) of the real property monitoring system 100 and, in some situations, may not be associated with the building 130. For example, a third-party may be an agent, adjuster, call-center representative image-capturing drone, or other representative of an insurance provider of an insurance policy providing coverage for the building 130, and the notes and/or images generated by the representative of the insurance provider (e.g., during the processing of an insurance claim and/or during a phone or email conversation) may be converted into a digital format and provided to the real property monitoring system 100 as third-party input.

In some scenarios, third-party input provided by representative of an insurance provider may be included in a file of an insurance claim, or otherwise attached thereto. A third-party may be a reporting agency, such as a news reporting agency, a weather service, local authorities, etc. Accordingly, third-party input provided by such sources may include, for example, maps, police reports, incident reports, and the like.

Additionally, the damage detector 226 may generate and/or obtain dynamic characteristic data indicative of various dynamic characteristics that have occurred at the building 130 and optionally their times of occurrence, frequencies, magnitudes, etc. The dynamic characteristic data that is associated with the building 130 may be generated, for example, based upon signals provided by the sensors 112 of the real property monitoring system 100, and optionally by other intelligent building products 110, 114, 116/116R, 118/118R.

At least some of the dynamic characteristic data may be provided to the damage detector 226 by the Local Monitor 224. Additionally or alternatively, the damage detector 226 may itself generate at least a portion of the dynamic characteristic data, and/or the damage detector 226 may read or access at least a portion of the dynamic characteristic data from the data storage area 146, 210.

Moreover, damage detector 228 may implement functionality for determining and/or detecting damage to the building 130 and/or other conditions associated with the building 130 using the third-party input and the dynamic characteristic data of the building 130, and thereby discovering and or determining one or more conditions associated with the building 130 that, for example, otherwise would not be characterized and/or even detected using only sensor-generated data 112 and/or the human eye. Specifically, in one implementation, the damage detector 228 may use the third-party input and the dynamic characteristic data of the building 130 to train a model, e.g., a statistical or analytical model, which may be stored in the data storage area 146, 210. The model may be predictive of one or more conditions that may be associated with the building 130, for example.

The damage detector 228 may apply the trained model to the dynamic characteristic data of the building 130 and/or to another set of dynamic characteristic data of the building 130. Outputs of the application of the trained model may indicate one or more conditions associated with the building 130 that are more strongly correlated with the building 130 than are other conditions. For example, the application of the trained model may indicate or discover one or more conditions that are associated with both the building 130 and the impacting event which was described by the content of the third-party input.

In one embodiment, particular damage to the building 130, e.g. that is at least in part caused by the impacting event, may be determined or discovered by using the trained model. Additionally or alternatively, other conditions associated with the building 130 such as, for example, causes of loss, quantified risk levels, adjustments to insurance policies, etc., may be determined or discovered by using the trained model. The damage detector 228 may provide an indication of one or more discovered conditions corresponding to the building 130 to other computing devices, to user interfaces, or to other systems, e.g., via the network 132.

Exemplary Computer-Implemented Method

Figure 3:
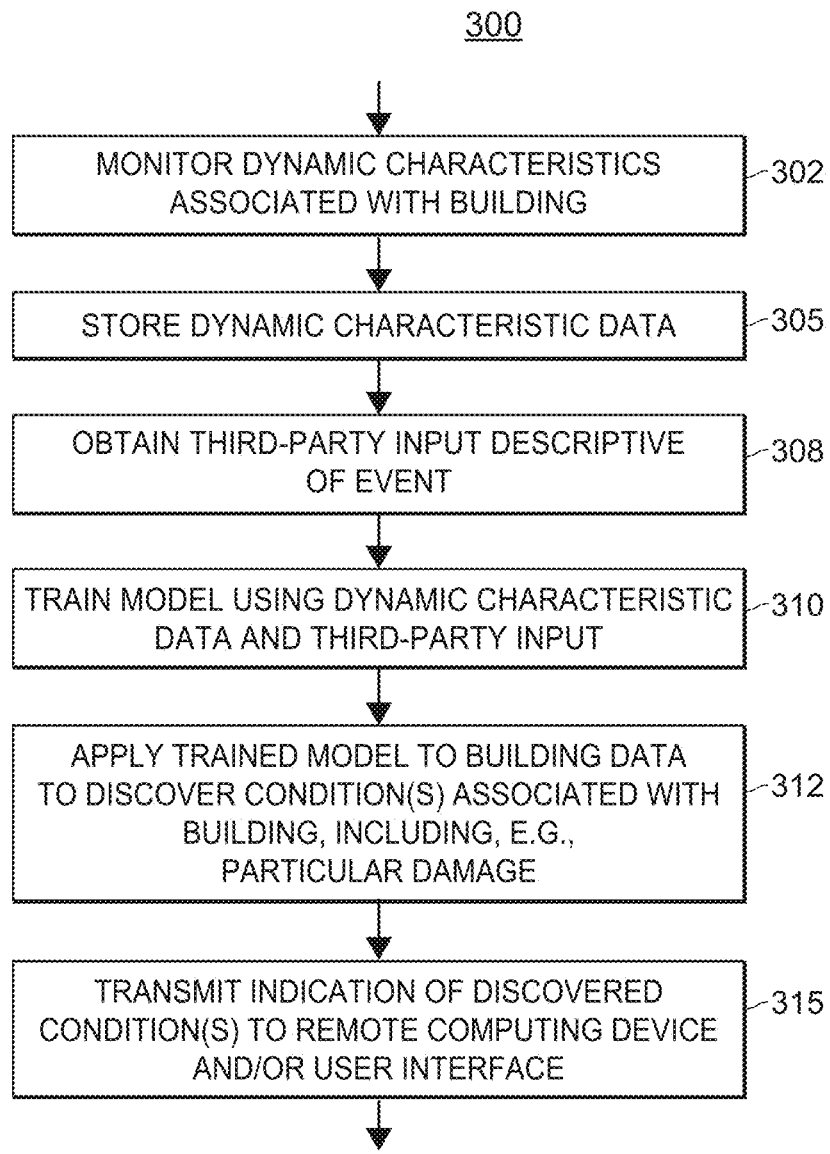
FIG. 3 illustrates a flow diagram of an exemplary computer-implemented method for detecting damage using a real property monitoring system that may operate in accordance with the described embodiments.

FIG. 3 depicts a flow diagram of an exemplary computer-implemented method 300 of a method for monitoring a building and/or detecting damage and other conditions at the building. At least a portion of the method 300 may be performed, for example, by one or more components of the real property monitoring system 100 of FIGS. 1 and 2, and/or by other suitable devices, apparatuses, and/or systems. For example, at least a portion of the method 300 may be performed by the local monitor 224 and/or by the damage detector 226 of the system 100. Additionally or alternatively, at least a portion of the method 300 may be performed by the front-end components 102 and/or the back-end components 104 of the system 100. For ease of illustration herein, the method 300 is discussed with simultaneous reference to FIGS. 1 and 2.

As shown in FIG. 3, the method 300 may include monitoring (block 302) a plurality of dynamic, physical characteristics associated with a building. For example, referring to FIGS. 1 and 2, a plurality of sensors 112 of a real property monitoring system 100 may be utilized to monitor one or more dynamic, physical characteristics of or associated with the building 130. The plurality of sensors 112 may generate signals indicative of sensed, respective dynamic, physical characteristics associated with the building 130, such as movement, motion, temperature, moisture, humidity, presence of smoke and/or gas, on/off (e.g., of various devices, appliances, etc.), open/closed (e.g., of various windows, doors, etc.), and the like. The plurality of sensors 112 may be fixedly disposed at respective locations at the building 130 and/or in its environment (e.g., on the interior of the building, on the exterior of the building, on a fixture disposed on a parcel of land or other real estate on which the building is located, etc.), and at least some of the plurality of sensors 112 may be fixedly attached to the building 100.

In one embodiment, monitoring the plurality of dynamic, physical characteristics of the building (block 302) may additionally include utilizing one or more controls 110, appliances 114, displays 116, and/or user interfaces 118 (e.g., one or more intelligent building products) of the system 100 to monitor at least some of the dynamic, physical characteristics, where the intelligent building product(s) 110, 114, 116, 118, 118R generate respective signals indicative of one or more dynamic, physical characteristics associated with the building 130. The signals generated by the sensors 112 (and optionally by the intelligent building products 110, 114, 116, 118, 118R) may be transmitted to the monitoring controller 106, the remote monitoring controller 106R, and/or the server 140.

Based upon the signals generated by the sensors 112 (and optionally by the intelligent building products 110, 114, 116, 118, 118R), dynamic characteristic data that is indicative of the plurality of dynamic, physical characteristics that are associated with the building 130 and that are being monitored by the plurality of sensors (and optionally by the intelligent building products 110, 114, 116, 118, 118R) may be generated and stored (block 305). For example, the intelligent monitoring application 222 may process the received signals (either individually, or in combination with other signals) to generate the dynamic characteristic data, and the dynamic characteristic data associated with the building 130 may be stored in a data storage entity that is included in the real property monitoring system 130 and that is communicatively connected to monitoring controller 106, the remote monitoring controller 106R, the server 140, the plurality of sensors 112, and/or to one or more of the intelligent building product(s) 110, 114, 116, 118, 118R (such as the data storage entities 146 and/or 210 shown in FIGS. 1 and 2, respectively).

Generally, the dynamic characteristic data is indicative of detected, various dynamically occurring physical conditions inside of, outside of, on, at, or near the building 130, and/or respective measurements, amounts, or other indication of magnitudes of the dynamically occurring, physical conditions associated with the building 130. The dynamic conditions may include, for example, dynamic conditions of a part or component of the building 130, or dynamic conditions to which the part or component of the building 130 is subjected. For example, the foundation of the building may be subjected to rising ground waters (a detectable dynamic condition associated with the building), and the foundation itself may suffer structural damage due to the exposure to rising ground waters (another detectable dynamic condition associated with the building).

Additionally or alternatively, the dynamic conditions may include dynamic conditions of an object that is disposed inside, on top of, on the property of, or otherwise near the building 130, and/or dynamic conditions to which such an object is subjected. For example, an electric kitchen oven may be subject to a power surge, and the oven may short out due to the power surge, both of which are examples of dynamic conditions associated with the building. In some scenarios, at least a portion of the dynamic characteristic data may be time-series data, and as such may include timestamps or other indications of respective times/dates at which the detected and/or measured dynamic conditions were observed or detected.

At a block 308, the method 300 may include receiving input that has been generated by a third-party, where the third-party input includes digitized information that is descriptive of an event that impacts the building 130, e.g., an "impacting event." Generally speaking, but not necessarily, an event that impacts the building 130 may not be able to be detected, described, and/or characterized (e.g., sufficiently characterized or described) only by the intelligent building products of the building 130 (e.g., the sensors 112, control(s) 110, appliance(s) 114, display(s) 116/116R, and/or user interface(s) 118, 118R). Indeed, in some situations, the intelligent building products 112, 110, 114, 116/116R, 118/118R of the building 130 may remain ignorant of the occurrence of the event impacting the building 130.

Some types of impacting events may be caused or precipitated by an actor and/or other factors that are external to and independent of the building 130 (e.g., aside from the impacting event, the actor/other factors causing the impacting event do not have a relationship or association with the building 130). Examples of such types of impacting events include environmental, situational, and/or weather-related events that occur in the area in which the building 130 is located, such as hurricanes, floods, wildfires, riots, earthquakes, manufacturing plant explosions, train derailments, etc. Other examples of such impacting events include events that are particular to the building 130, such as an out-of-control vehicle running into the building, a malfunctioning drone that falls onto the building or is propelled through a window of the building, a failure of a gas or water pipe that delivers utilities to the building, etc. Some types of events that impact the building 130 may be caused or precipitated by objects or people inside or around the building 130, for example, a clothes dryer that catches on fire, a tree that falls on the roof of the building, a person who slips and falls down a staircase or the front steps of the building 130, etc.

At any rate, the digitized information included in the third-party input may be of any suitable digital or digitized format or formats, such as digital notes and/or text (e.g., free-form notes and/or text), images, numbers, files, and/or other digital data formats. Similar to the dynamic characteristic data, the third-party input data may be descriptive and/or indicative of the impacting event and/or of various characteristics of the impacting event, and optionally respective measurements, amounts, or indications of magnitudes of various portions of the event. Respective timestamps may capture the dates/times at which the various third-party input data points were collected or observed.

Typically, the third-party that generates or provides the third-party input that is descriptive of the impacting event is not a building owner, building property manager, resident, tenant, or other end-user of the monitoring system 100. As such, the third-party input data may identify and/or characterize various aspects of the event from a perspective that is different than that which is able to be sensed by the intelligent building products of the building 130 and/or that is different than the immediate experiences and observations of end-users of the building 130. For example, sensors 112 at the building 130 may detect a high wind speed, while the third-party input may describe a tornado, and thus the resulting high wind speeds detected by the sensors 112. In another example, sensors 112 at the building 130 may detect rising waters in the basement, while the third-party input may describe a break in a levee.

The content of the third-party input may be generated or provided by one or more different third-parties. For example, a third-party may be an agent, adjustor, call-center representative, image-capturing drone, or other representative of an insurance provider of an insurance policy for the building 130. Input provided by such types of third-parties may be provided in real-time, on demand, and/or in conjunction with an insurance claim associated with the building 130, e.g., when maintained in or attached to a file of the insurance claim.

A third-party may be another party who is not an end-user of the monitoring system 100 of the building 130 and who is not a representative of the building's insurance provider. For example, a report on a travel path and strength of a hurricane provided by the National Weather Service, a police report indicating the path of a runaway vehicle, and a map of where and when city-wide power outages occurred may be considered to be third-party input. The third-party input may be received (block 308) via one or more network interfaces 121, 134 of the real property monitoring system 100 and, in some scenarios, via the network 132.

At a block 310, the method 300 may include training a model based upon the dynamic characteristic data associated with the building 130 and the third-party input. The model may be, for example, a statistical or analytical model, which may be a publicly-available or proprietary model. The model may be predictive of one or more conditions that may be associated with the building 130. For example, the one or more conditions associated with the building 130 may include particular damage at the building 130 that was caused by the occurrence of the impacting event, and that otherwise would not be discoverable via human observation or investigation and, in some scenarios, would not be discoverable via the intelligent building products 110, 112, 114, 116/116R, 118/118R of the building 130. For instance, the specific damage to circuits, pipes, and other building support systems that are positioned between walls of the building and that are not being monitored by any intelligent building products 110, 112, 114, 116/116R, 118/118R may be discovered and quantified using the model, without requiring any human, physical investigation such as opening up the walls.

In one embodiment, the model may be trained (block 310) using the dynamic characteristic data associated with the building 130, the third-party input, and additional types of data. For example, the model may be trained by utilizing the dynamic characteristic data of the building 130, the third-party input, and static characteristic data associated with the building 130. Generally speaking, static characteristic data associated with the building 130 may include data that is descriptive or indicative of one or more static characteristics of the building 130 such as, for example, a type of the building (e.g., ranch, Cape Cod, apartment building, storage warehouse, etc.), a material or product used to construct the building (e.g., roofing, insulation, concrete, vapor barriers, etc.), a make, model, and/or year of an appliance inside the building, the grading of the parcel of land on which the building is located, and other static characteristics.

Additionally or alternatively, the model may be trained (block 310) by utilizing historical insurance claim data, which may pertain to the building 130 and/or may pertain to other buildings. Historical insurance claim data may include indications, for example, of whether or not an insurance claim was paid; costs of material and/or labor for replacement or repair; types of injuries, where treated, how treated, etc.; disbursements related to the claim such as hotel costs, rental car costs, and/or other types of payouts; causes of loss; and the like. Historical insurance claim data may include indications, for example, of static characteristic data and dynamic characteristic data of the building 130 and/or of other buildings, third-party input related to the historical insurance claims, and/or any other types of data that is associated with historical insurance claims of buildings and/or real properties. Generally, historical insurance claim data may be obtained from files or other records of insurance claims that have been filed for the building 130 and/or for other buildings.

As such, at a block 312, the method 300 may include applying the trained analytics model to the dynamic characteristic data corresponding to the building and/or to additional dynamic characteristic data corresponding to the building, thereby discovering particular damage to the building that corresponds to the impacting event, e.g., particular damage that is caused, at least in part, by the occurrence of the impacting event. For example, the nature, the location, and/or the degree of particular damage of the building 130 may be discovered at the block 312.

In one embodiment, one or more additional conditions may also be discovered at the block 312. For example, a cause of loss that is associated with both the building 130 and the impacting event may be discovered at the block 312. The discovered cause of loss may be a known cause of loss, e.g., the discovered cause of loss is included in a set of causes of loss known to and utilized by an insurance provider to assess insurance claims (e.g., wind, fire, hail, mold, smoke, weight of snow or ice, freezing pipes, etc.).

In some scenarios, a discovered cause of loss may be a new cause of loss that is excluded from the set of known causes of loss. In these scenarios, the method 300 may include updating the set of known causes of loss to include the newly discovered cause of loss. In another example, additional conditions corresponding to the building 130 that may be discovered at the block 312 may include adjustments to one or more terms of an insurance policy that provides coverage for the building 130. For instance, an adjustment to the pricing and/or other financial terms of the insurance policy (e.g., a premium amount, a deductible amount, a coverage amount, a replacement amount, etc.) may be discovered by applying the trained analytics model to dynamic characteristic data of the building 130 and to the third-party input.

The pricing and/or other financial terms of the insurance policy may be adjusted to more accurately reflect the risk, or the lack thereof, associated with the building 130, and in particular, in light of the impacting event as described by the third-party input. As such, an owner of the building 130 is able to obtain insurance coverage for the building 130 with a policy and terms that more accurately reflect the usage of the building 130 as well as the impact of various events on the building 130.

At a block 315, the method 300 may include transmitting an indication of the discovered condition(s), e.g., the discovered particular damage of the building 130, to the remote computing device and/or to a user interface. For example, an indication of the particular damage to the building 130 and/or of other conditions may be transmitted, via the network 132, to the remote monitor 142, to a computing system of an insurance provider, to a computing system of a first responder, to an end-user of the monitoring system 100, etc. The recipient computing system (and, in some embodiments, the real property monitoring system 100 itself) may then initiate suitable actions and/or activities to mitigate the discovered condition(s).

In one embodiment (not shown in FIG. 3), the method 300 may include re-training or updating the model. For example, the model may be re-trained or updated by using the third-party input, the dynamic characteristic data of the building 130, and subsequently received data. Subsequently received data may include, for example, subsequently received third-party input, subsequently received dynamic characteristic data of the building 130 and/or of other buildings, subsequently received insurance claim data of the building 130 and/or of other buildings, other types of data corresponding to the building 130 and/or to other buildings that is subsequently received, and/or other types of data corresponding to the impacting event and/or similar events that is subsequently received.

The re-trained or updated model may be then utilized to discover additional information which, for example, may include additional detail, aspects, accuracy, and/or precision to the information descriptive of the previously-discovered condition(s), and/or may include one or more new conditions that the previous model was unable to discover. For example, as more insurance claim data related to hurricane damage is used to train the model, future applications of the updated model are more quickly and accurately able to differentiate hurricane damage from other types of wind and/or water damage.

In one embodiment, the model may be updated periodically, repeatedly, or upon demand. The updated model may then be applied to discover one or more adjustments to an insurance policy and/or to a group of insurance policies, such as an adjustment to pricing and/or other insurance terms. As such, pricing models of insurance policies are able to more accurately reflect current risk (or lack thereof) to the buildings and other real property for which the insurance policies provide coverage.

The benefits of just-in-time, accurate risk assessment using real property monitoring systems may be continually adjusted and passed along to end-users throughout the terms of their insurance policies. Moreover, insurance providers are able to better re-allocate pricing and other insurance terms amongst various portions of their customer base to more efficiently mitigate overall risk. Of course, any data corresponding to the building 130 that is collected and utilized by the real property monitoring system 100 would be utilized with any of the systems and methods disclosed herein with permission or affirmative consent of the owner, tenant, property manager, and/or other end-user associated with the building 130.

Thus, in view of the above, the systems, methods, and/or techniques (or portions thereof) disclosed herein for using a real property monitoring system to automatically detect damage and/or other conditions at a building (and in particular, to detect damage at the building caused, at least in part, by an impacting event) enable such damage and/or other conditions to be more quickly and accurately ascertained, discovered, and/or characterized as compared to currently known techniques. Indeed, in some scenarios, damage that was previously undetectable by non-invasive techniques (e.g., damage that required human investigation and actions, such as cutting into walls, testing electrical circuits, etc. to detect and characterize the damage) and/or other conditions are able to be automatically (as well as quickly and more accurately) detected and identified using at least portions of the systems, methods, and/or techniques disclosed herein.

As such, risk (or lack thereof) of loss associated with the building is also able to be automatically, quickly, and accurately identified. Accordingly, more appropriate and suitable risk mitigation techniques may be able to be applied at or to the building 130, e.g., in a more timely manner, to thereby prevent additional damage and/or loss from occurring.

Overview of Artificial Intelligence Platform for Real Property

The embodiments described herein may relate to, inter alia, determining an accurate, granular real property insurance risk level corresponding to a plurality of inputs. More particularly, in some embodiments, one or more neural network models (and/or other machine learning models, modules, algorithms, or programs, or other artificial intelligence models, modules, algorithms, or programs) may be trained using historical insurance claims data as training input. Historical insurance claims data may include, for example, indications of static characteristic data and dynamic characteristic data of buildings and/or real properties; third-party input related to the historical insurance claims; whether or not an insurance claim was paid; costs of material and/or labor for replacement or repair; types of injuries; where treated, how treated, etc.; disbursements related to the claim such as hotel costs, rental car costs, and/or other types of payouts; causes of loss; and/or other data associated with historical insurance claims corresponding to buildings and/or real properties. Generally speaking, historical insurance claims data may be obtained from files or other records of insurance claims that been filed for buildings and/or other real properties.

Risk levels related to building and/or real property insurance may be determined using the techniques described herein for any number of assessments that are performed with respect to building and/or real property insurance. In an example scenario, at least some of the techniques disclosed herein may be utilized to determine risk levels corresponding to an application for a new insurance policy to provide coverage for a building or real property, such as during the underwriting process and/or at other stages of processing a building a real property insurance application. In another example scenario, at least some of the techniques disclosed herein may be utilized to determine risk levels corresponding to a renewal or continuing eligibility of an existing insurance policy for a building or real property, such as during the re-underwriting process and/or other stages of processing the renewal or continuing eligibility of the existing insurance policy.

As such, an application for a new insurance policy for building and/or real property insurance, a renewal or re-underwriting of an existing insurance policy for building and/or real property insurance, or information associated with a claim against an existing insurance policy for building and/or real property insurance may be provided to a client computing device (e.g., a smartphone, tablet, laptop, desktop computing device, wearable, or other computing device) of a user. A user of the application, who may be an employee of a company or other entity employing the methods described herein or a customer of that company, may enter input into the application via a user interface or other means. The input may be transmitted from the client computing device to a remote computing device (e.g., one or more servers) via a computer network, and then processed further, including by applying input entered into the client to the one or more trained neural network models (and/or other machine learning models, modules, algorithms, or programs) to produce labels and weights indicating net or individual risk factors. Additionally or alternatively, input may be transmitted from a real property monitoring system, such as the system 100, to the remote computing device for additional processing by the one or more trained neural network models (or other trained machine learning models, modules, algorithms, or programs).

For example, the remote computing device may receive the input and determine, using a trained neural network (or other machine learning model, module, algorithm, or program), one or more risk indicators applicable to the input, and/or a risk level. Herein risk indicators may be expressed numerically, as strings (e.g., as labels), or in any other suitable format. Risk levels may be expressed as Boolean values (e.g., risk/no risk), scaled quantities (e.g., from 0.0-1.0), or in any other suitable format. The determined risk indicators and/or risk level may be displayed to the user, and/or may be provided as input to another application (e.g., to an application which uses the risk indicators and calculated risk in an insurance quotation calculation or for other purposes). An insurance quotation may include a price, parameters describing the real property, and/or one or more identified risk indicators, among other information.

In some scenarios, additional or alternative information may be generated (e.g., by one or more other applications) based upon the determined risk indicators and/or risk level, and such information may be provided to the client computing device and/or to other computing devices of the insurance company. Examples of additional or alternative risk-related information which may be generated include risk mitigation imperatives or actions (and optionally respective urgencies thereof) corresponding to a building and/or real property insurance policy application, to an associated insurance claim, to a renewal of an existing building and/or real property insurance policy, or to a re-underwriting of an existing building and/or real property insurance policy may be determined based upon the determined risk indicators, and may be provided to the client computing device and/or to other computing devices of the insurance company. For example, the techniques described herein may generate a risk mitigation imperative that is transmitted to a customer's mobile device, e.g., "clean out dryer vent." In another example, the techniques described herein may generate a risk mitigation imperative to an insurance provider to increase a deductible on a particular homeowner's policy, e.g., when a customer has a high frequency of small claims.

Other risk-related information such as a mitigation plan (which may include multiple mitigation imperatives or actions, and optionally respective urgencies thereof), notifications, etc. may be additionally or alternatively determined based upon the determined risk indicators, and may be provided to the client computing device and/or to other computing devices of the insurance company. By transmitting input to the remote computing device for processing and analysis, an accurate risk level and/or other risk-related information may be determined based upon a wealth of historical knowledge and provided to the user in what may appear to the user to be a very rapid, even instantaneous, manner.

Exemplary Environment for Identifying Risk Factors and Calculating Risk in Data

Figure 4:
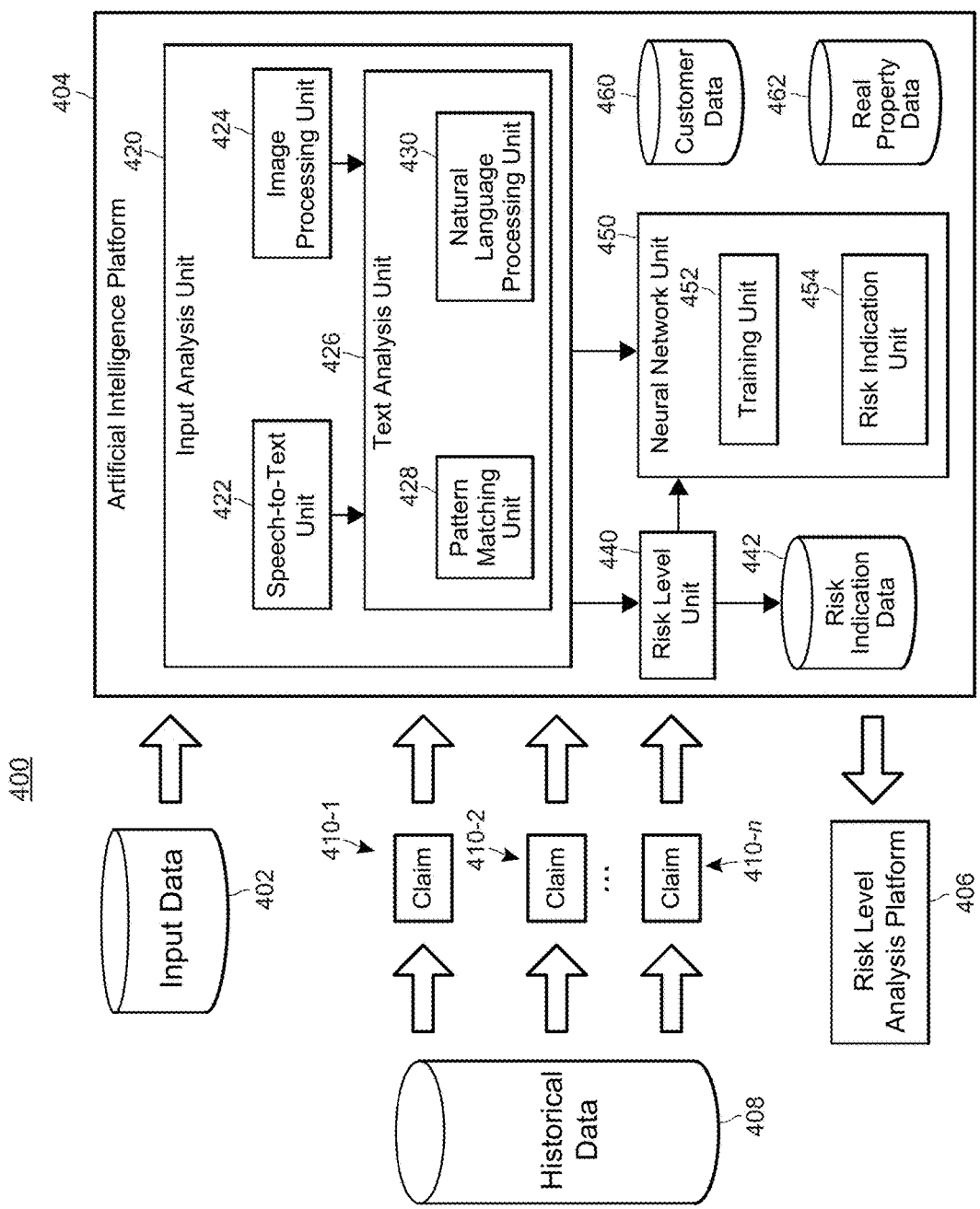
FIG. 4 depicts an exemplary computing environment in which techniques for training a neural network to identify a risk level of a building or other real property may be implemented, according to one embodiment.

Turning to FIG. 4, an exemplary computing environment 400, representative of artificial intelligence platform for real property insurance, is depicted. The computing environment 400 may be at least partially included with the system 100, in some implementations. Environment 400 may include input data 402 and historical data 408, both of which may comprise a list of parameters, a plurality (e.g., thousands or millions) of electronic documents, or other information. As used herein, the term "data" generally refers to information which exists in the environment 400 and is related to a real property (e.g., a house, a home, a building, a parcel of land, or other type of real property), e.g., input data 402 and/or historical data 408. For example, data may include an electronic document representing a real property insurance claim, telematics information indicative of environmental conditions at and/or human usage of the real property, information related to the type of real property and/or its characteristics and materials of which it is comprised, and/or other information.

Data may be historical or current. Although data may be related to an ongoing claim filed by an owner of real property, in some embodiments, data may consist of raw data parameters entered by a human user of the environment 400 or which is retrieved/received from another computing system, such as the real property monitoring system 100.

Data may or may not relate to the claims filing process, and while some of the examples described herein refer to real property insurance claims, it should be appreciated that the techniques described herein may be applicable to other types of electronic documents, in other domains. For example, the techniques herein may be applicable to identifying risk factors in other insurance domains, such as agricultural insurance, vehicle insurance, health or life insurance, renters insurance, etc. In that case, the scope and content of the data may differ.

As another example, data may be collected from an existing customer filing a claim, a potential or prospective customer applying for a new insurance policy or renewing an existing insurance policy, an insurance provider (e.g., the proprietor of the environment 400) renewing or re-underwriting an existing insurance policy, etc., or data may be supplied by a third party such as a company other than the proprietor of the environment 400. In some cases, data may reside in paper files that are scanned or entered into a digital format by a human or by an automated process (e.g., via a scanner). Generally, data may comprise any digital information, from any source, created at any time.

Input data 402 may be loaded into an artificial intelligence system 404 to organize, analyze, and process input data 402 in a manner that facilitates efficient determination of risk levels by risk level analysis platform 406. The loading of input data 402 may be performed by executing a computer program on a computing device that has access to the environment 400, and the loading process may include the computer program coordinating data transfer between input data 402 and AI platform 404 (e.g., by the computer program providing an instruction to AI platform 404 as to an address or location at which input data 402 is stored). As previously discussed, input data 402 may include data that has been entered and stored by a user (e.g., via a mobile computing device or other client device), and/or may include telematics data generated by one or more buildings or other types of real property that is automatically received by the system 400, e.g., from one or more real property monitoring systems 100, and stored.

AI platform 404 may reference the address at which input data 402 is stored to retrieve records from input data 402 to perform risk level determination techniques. AI platform 404 may be thought of as a collection of algorithms configured to receive and process parameters, and to produce labels and, in some embodiments, risk and/or pricing information.

As discussed below with respect to FIGS. 5, 6, and 7, AI platform 404 may be used to train multiple neural network models (and/or other machine learning models, modules, algorithms, or programs) relating to different granular segments of real properties. For example, AI platform 404 may be used to train a neural network model (or other machine learning model, module, algorithm, or program) for real properties that are over 100 years old. In another embodiment, AI platform 404 may be used to train a neural network model (or other machine learning model, module, algorithm, or program) for use in predicting risk of real properties located in a particular state or locality. One embodiment of a manner in which neural networks are created and trained is described below.

In the embodiment of FIG. 4, AI platform 404 may include claim analysis unit 420 (which is also interchangeably referred to herein as "input analysis unit 420"). Claim analysis unit 420 may include speech-to-text unit 422 and image analysis or image processing unit 424 which may comprise, respectively, algorithms for converting human speech into text and analyzing images (e.g., extracting information from hotel and rental receipts). In this way, data may comprise audio recordings (e.g., recordings made when a customer telephones a customer service center) that may be converted to text and further used by AI platform 404. Additionally or alternatively, data may include images of handwritten, typed, or printed notes (e.g., that are attached to an insurance claim, that are transcribed by an employee or other staff member, that are received in an email, etc.) that may be converted to text and further used by the AI platform 404. In some embodiments, customer behavior represented in data—including the accuracy and truthfulness of a customer—may be encoded by claim analysis unit 420 and used by AI platform 404 to train and operate neural network models (and/or other machine learning models, modules, algorithms, or programs).

Claim analysis unit 420 may also include text analysis unit 426, which may include pattern matching unit 428 and natural language processing (NLP) unit 430. In some embodiments, text analysis unit 426 may determine facts regarding claim inputs (e.g., the amount of money paid under a claim). Amounts may be determined in a currency- and inflation-neutral manner, so that claim loss amounts may be directly compared. In some embodiments, text analysis unit 426 may analyze text produced by speech-to-text unit 422 or image analysis unit 424.

In some embodiments, pattern matching unit 428 may search textual claim data loaded into AI platform 404 for specific strings or keywords in text (e.g., "dryer vent blocked") which may be indicative of particular types of risk. NLP unit 430 may be used to identify, for example, entities or objects indicative of risk (e.g., that an injury occurred to a person, and that the person's leg was injured). NLP unit 430 may identify human speech patterns in data, including semantic information relating to entities, such as people, vehicles, homes, and other objects.

Relevant verbs and objects, as opposed to verbs and objects of lesser relevance, may be determined by the use of a machine learning algorithm analyzing historical claims. For example, both a dryer vent, occurrences of dryer-related fires, and dates/times of general usage of the dryer may be relevant objects. Verbs indicating the setting of an alarm system and/or the turning on and off of outside lighting may be relevant verbs. In some embodiments, text analysis unit 426 may comprise text processing algorithms (e.g., lexers and parsers, regular expressions, etc.) and may emit structured text in a format which may be consumed by other components.

In the embodiment of FIG. 4, AI platform 404 may include a risk level unit 440 to determine risk based upon analysis of data. Risk may be calculated with respect to individual attributes or elements of data, such as by assigning a risk score between 0 and 1 to a given attribute (e.g., dryer vent). In other embodiments, risk level unit 440 may determine an indication of risk by generating labels which pertain to data in whole or in part. This labeling may be accomplished in various different ways, depending on the embodiment.

For example, risk level unit 440 may label input data 402, or portions thereof, according to positive or negative pattern matching according to pattern matching unit 428. For example, if input data 402 matches the pattern "dryer vent blocked," then input data 402 may receive labels such as (BLOCKED, VENT, DRYER) or (FIRE, APPLIANCE). Alternately, in some embodiments, risk level unit 440 may label input data 402, which may be raw data or a claim filed by a customer, according to results obtained from natural language processing unit 430 (e.g., JEWELRY, THEFT). Risk level unit 440 may label input data 402 according to Boolean values (e.g., PAID/NOT-PAID) or pre-determined ranges (e.g., claims having a payout of $0-$50,000; $50,000-$500,000; $500,000-$1,000,000; or >=$1,000,000).

Labels may be saved to and/or retrieved from an electronic database, such as risk indication data 442, and claim labels may be generated from already-existing labels, and/or dynamically created labels (i.e., labels created at runtime) by risk level unit 440. A set of labels may be associated with a set of input data 402, and the creation of new labels may be partially or entirely based upon existing labels and/or input data 402.

Dynamic creation of labels may, in some embodiments, be based upon user attributes and/or metadata. For example, a resident of the Eastern United States may be assigned a label related to weather or another attribute unique to the region; for example, a hurricane- or flood-related label.

As noted, in some embodiments, risk level unit 440 may analyze input data 402 (e.g., label claims) through the use of a neural network unit 450. Neural network unit 450 may use an artificial neural network, or simply "neural network." The neural network may be any suitable type of neural network, including, without limitation, a recurrent neural network or feed-forward neural network. The neural network may include any number (e.g., thousands) of nodes or "neurons" arranged in multiple layers, with each neuron processing one or more inputs to generate a decision or other output.

In some embodiments, neural network models (and/or other machine learning models, modules, algorithms, or programs) may be chained together, so that output from one model is fed into another model as input. For example, risk level unit 440 may, in one embodiment, apply input data 402 to a first neural network model (or other machine learning model, module, algorithm, or program) that is trained to generate labels. The output (e.g., labels) of this first neural network model (or other machine learning model, module, algorithm, or program) may be fed as input to a second neural network model (or other machine learning model, module, algorithm, or program) which has been trained to predict, for example, claim settlement amounts based upon the presence of labels. The second neural network (or other machine learning model, module, algorithm, or program) may be trained using an inflation-adjusted set of claim payout amounts, and respective set of risk labels, to very accurately predict the amount of money likely to be paid on a new claim, given only a new set of risk labels from the first model. In another arrangement, the output of the first neural network model (or other machine learning model, module, algorithm, or program) may be fed as an input to a third neural network model (or other machine learning model, module, algorithm, or program) which has been trained to predict, for example, a likelihood of damage to a dwelling and respective repair and/or replacement costs. The third neural network (or other machine learning model, module, algorithm, or program) may be trained based upon insurance claim data and respective sets of risk labels, for example.

Other neural network models may be trained (and optionally chained) to predict other parameters corresponding to and/or attributes of buildings, real properties, and/or associated risk and risk mitigation based upon labeled input data. For example, sets of neural networks may collectively operate on input data 402 and/or historical claim data 408 to predict parameters and/or attributes such as claim risk factors (and optionally respective measures, levels, or quantifications of risk for each risk factor); risk mitigation imperatives or actions; claim settlement amounts; confidence levels, other labels; etc.

Neural network unit 450 may include training unit 452, and risk indication unit 454. To train the neural network to identify risk, neural network unit 450 may access electronic claims within historical data 408. Historical data 408 may comprise a corpus of documents including many (e.g., millions) of insurance claims which may contain data linking respective customers or claimants to one or more real properties, and which may also contain, or be linked to, information pertaining to the customers. In particular, historical data 408 may be analyzed by AI platform 404 to generate claim records 410-1 through 410-n, where n is any positive integer. Each claim 410-1 through 410-n may be processed by training unit 452 to train one or more neural networks (or other machine learning model, module, algorithm, or program) to identify claim risk factors, including by pre-processing of historical data 408 using input analysis unit 420 as described above, e.g., to generate corresponding labels. For example, the training unit 452 may train an artificial neural network (or other artificial intelligence or machine learning algorithm, model, or module) by using a subset of the historical claim data 408 that has respective labels applied thereto. The training unit 452 may test and/or validate the trained network (or the trained, other artificial intelligence or machine learning algorithm, model, or module) by using another non-overlapping subset of the historical claim data 408 (which may or may not have corresponding labels) to determine the accuracy of the fit of the trained network/algorithm/model/module, and in some cases, to avoid or mitigate over- or under-fitting.

Generally speaking, training an artificial neural network, machine learning algorithm, model, or module may include establishing a network architecture, or topology, by adding layers such as activation functions (e.g., a rectified linear unit, softmax, etc.), loss function, and optimizer, to name a few. The data used to train, test, and/or validate the neural network (e.g., the historical claim data 408) may include respective data corresponding to a large group of inputs, which may be labeled, and which may be divided into training, validation, and testing data (e.g., mutually exclusive subsets of the historical claim data 408). Data that is input to the neural network (e.g., for training, testing, or validation purposes) may be encoded in an N-dimensional tensor, array, matrix, or other suitable data structure.

In one embodiment, a different or specific neural network type may be selected or chosen to be trained (e.g., a recurrent neural network, a convolutional neural network, a deep learning neural network, etc.). Training may be performed by successive evaluation (e.g., looping) of the network by using labeled training samples, e.g., subsets of the labeled historical claim data 408. The process of training the artificial neural network may cause weights or parameters of the artificial neural network to be created. The created weights may correspond to, for example, one or more labels, either alone or in combination; static characteristics of buildings and/or real properties, dynamic characteristics of buildings and/or real properties, and/or combinations thereof; and/or other information, attributes, characteristics, or parameters included in and/or derived from the historical claim data. In some implementations, the weights may be initialized to random values. The weights may be adjusted as the network is successively trained, e.g., by using one of several gradient descent algorithms, to reduce loss and to cause the values output by the network to converge to expected, or "learned," values.

In one embodiment, a regression neural network, which has no activation function, may be selected or chosen. Therein, input data may be normalized by mean centering, and a mean squared error loss function may be used, in addition to mean absolute error, to determine the appropriate loss as well as to quantify the accuracy of the outputs.

Trained networks, algorithms, models, and/or modules may be subject to validation and cross-validation using standard techniques (e.g., by hold-out, K-fold, etc.). In some embodiments, multiple neural networks may be separately trained and operated.

At any rate, neural network 450 may, from a trained model (or other machine learning model, module, algorithm, or program), identify labels that correspond to specific data, metadata, and/or attributes within input data 402, depending on the embodiment. For example, neural network 450 may be provided with instructions from input analysis unit 420 indicating that one or more particular type of insurance is associated with one or more portions of input data 402.

Neural network 450 may identify one or more insurance types associated with the one or more portions of input data 402 (e.g., dwelling coverage, personal property or contents coverage, personal liability, earthquake insurance, flood insurance, water back up of sewer, other structures insurance, medical payments, etc.) and by input analysis unit 420. In one embodiment, the one or more insurance types may be identified by training the neural network 450 based upon types of peril. For example, the neural network model (or other machine learning model, module, algorithm, or program) may be trained to determine that fire, theft, or vandalism may indicate comprehensive property owner's insurance coverage.

In addition, input data 402 may indicate a particular real property. In that case, risk level unit 440 may look up additional real property information from customer data 450 corresponding to the owner of the particular real property, and real property data 452 corresponding to the particular real property, respectively. For example, the age and/or type of the particular real property (e.g., single family home, apartment building, business storefront, etc.) may be obtained. In another example, if a customer is a business or corporation that owns multiple buildings, customer data 450 may include historical data of claims filed by the owner for any of the multiple buildings. The additional customer and/or real property information may be provided to neural network unit 450 and may be used to analyze and label input data 402 and, ultimately, may be used to determine risk. For example, neural network unit 450 may be used to predict risk based upon inputs obtained from a party applying for an insurance policy for the real property, or based upon a claim submitted by a party who is a holder of an existing insurance policy. That is, in some embodiments where neural network unit 450 is trained on claim data, neural network unit 450 may predict risk based upon raw information unrelated to the claims filing process, or based upon other data obtained during the filing of a claim (e.g., a claim record retrieved from historical data 408).

In one embodiment, the training process may be performed in parallel, and training unit 452 may analyze all or a subset of claims 410-1 through 410-*n*. Specifically, training unit 452 may train a neural network (or other machine learning model, module, algorithm, or program) to identify claim risk factors in claim records 410-1 through 410-*n*. As noted, AI platform 404 may analyze input data 402 to arrange the historical claims into claim records 410-1 through 410-*n*, where n is any positive integer.

Claim records 410-1 through 410-*n* may be organized in a flat list structure, in a hierarchical tree structure, or by means of any other suitable data structure. For example, the claim records may be arranged in a tree wherein each branch of the tree is representative of one or more customer. There, each of claim records 410-1 through 410-*n* may represent a single non-branching claim, or may represent multiple claim records arranged in a group or tree.

Further, claim records 410-1 through 410-*n* may comprise links to customers and real properties whose corresponding data is located elsewhere. In this way, one or more claims may be associated with one or more customers and one or more real properties via one-to-many and/or many-to-one relationships. Risk factors may be data indicative of a particular risk or risks associated with a given claim, customer, and/or real property. The status of claim records may be completely settled or in various stages of settlement.

As used herein, the term "claim" or "real property claim" generally refers to an electronic document, record, or file, that represents an insurance claim (e.g., an insurance claim on a house, home, building, or other type of real property) submitted by a policy holder of an insurance company. Herein, "claim data" or "historical data" generally refers to data directly entered by the customer or insurance company including, without limitation, free-form text notes, photographs, audio recordings, written records, receipts (e.g., hotel and rental car, purchase of replacement materials, repair labor, etc.), and other information including data from legacy, including pre-Internet (e.g., paper file), systems. Notes from claim adjusters and attorneys may also be included.

In one embodiment, claim data may include claim metadata or external data, which generally refers to data pertaining to the claim that may be derived from claim data or which otherwise describes, or is related to, the claim but may not be part of the electronic claim record. Claim metadata may have been generated directly by a developer of the environment 400, for example, or may have been automatically generated as a direct product or byproduct of a process carried out in environment 400. For example, claim metadata may include a field indicating whether a claim was settled or not settled, and amount of any payouts, and the identity of corresponding payees.

Another example of claim metadata is the geographic location in which a property is located. Yet another example of claim metadata includes a category of the claim type (e.g., damage to the building structure, theft of articles, liability, etc.). For example, a single claim in historical data 408 may be associated with a company that owns and/or leases several buildings, and may include the name, address, and other information relating to the company and well as information pertaining to the building portfolio owned/leased by the company.

The claim may include a plurality of claim data and claim metadata, including metadata indicating a relationship or linkage to other claims in historical claim data 408. In this way, neural network unit 450 may produce a neural network that has been trained to associate the presence of certain input parameters with higher or lower risk levels. A specific example of a claim is discussed with respect to FIG. 5, below.

Once the neural network (or other machine learning model, module, algorithm, or program) has been trained, risk indication unit 454 may apply the trained neural network (or other trained machine learning model, module, algorithm, or program) to input data 402 as processed by input analysis unit 420. In one embodiment, input analysis unit 420 may merely "pass through" input data 402 without modification. The output of the neural network (or other machine learning model, module, algorithm, or program), indicating risk indications, such as labels pertaining to the entirety of, or portions of input data 402, may then be provided to risk level unit 440. Risk level unit 440 may insert the output of the neural network (or other machine learning model, module, algorithm, or program) (e.g., labels) into an electronic database, such as risk indication data 442. Alternatively, or additionally, risk indication unit 454 may use label information output by the neural network (or other machine learning model, module, algorithm, or program) to determine attributes of input data 402, and may provide those attributes to risk level unit 440.

In some embodiments, each label or attribute may be associated with a confidence score and/or weight. Confidence scores may be assigned based upon the source of the information (e.g., if the information is from real property data 574, such as telematics data, then a score of 1.0 may be assigned; whereas, if the information is inferred and/or provided by a user, a lower confidence score may be assigned). Risk level unit 440 may then forward the labels and/or scores to risk level analysis platform 406. In some embodiments, determining a single label may require neural network unit 450 to analyze several attributes within input data 402. For example, an application for a new homeowners insurance policy may be required to provide the home's age, type (e.g., ranch, two-story, split-level, etc.), and geographical location. Some models may include validation that will produce an error state if a required piece of information is not provided.

AI platform 404 may further include customer data 450 and real property data 452, which risk level unit 440 may leverage to provide useful input parameters to neural network unit 450. Customer data 450 may be an integral part of AI platform 404, or may be located separately from AI platform 404. In some embodiments, customer data 450 or real property data 452 may be provided to AI platform 404 via separate means (e.g., via an API or Application Programming Interface call), and may be accessed by other units or components of environment 400. Either may be provided by a third-party service.

Real property data 452 may include a database comprising information describing various types of real property, including information about legal names or identification of properties, the year a structure was built, square footage, location, materials used, amount of personal property insured, whether or not additional types of insurance such as flood or earthquake insurance was purchased for the property, etc. Real property data 452 may indicate whether or not a property is equipped with various features which may affect risk (e.g., security sensors and/or systems, automatic sprinkler systems, motion detectors, etc.).

Both of customer data 450 and real property data 452 may be used to train a neural network model (or other machine learning model, module, algorithm, or program). For example, in an example of a new property insurance application to cover a target property, risk level unit 440 may look up the applicant in the customer data 450 to determine the presence and contents of the applicant's property insurance claim history (e.g., for other properties that have been owned by the applicant), and may obtain from real property data 452 the knowledge of various characteristics of the target property and/or any property insurance claims that were filed by previous owners of the target property.

All of the information pertaining to the applicant may then be provided to neural network unit 450, which may—based upon its prior training on claims from historical data 408—determine that a plurality of labels apply to the applicant and/or to the target property. For example, the labels may include (e.g., FLOODPLAIN, BASEMENT). As noted, the labels may have a respective confidence factor, and may be sorted in terms of criticality, and/or given pre-assigned weights. The labels and/or weights may be stored in risk indication data 442, in an embodiment. It should be appreciated that the use of additional real property labels (e.g., FINISHED-BASEMENT, SUMP PUMP, GENERATOR) is envisioned in label generation.

In some embodiments, pattern matching unit 428 and natural language processing unit 430 may act in conjunction to determine labels. For example, pattern matching unit 428 may include instructions to identify words indicating flooding or the undesired presence of water (e.g., "leak," "damp," "puddle," "mold"). Matched data may be provided to natural language processing unit 430, which may further process the matched data to determine parts of speech such as verbs and objects, as well as relationships between the objects.

The output of natural language processing unit 430 may be provided to neural network unit 450 and used by training unit 452 to train a neural network model (or other machine learning model, module, algorithm, or program) to label insurance types. For example, if natural language processing unit 452 indicates a theft of electronics or other personal property, then the neural network (or other machine learning model, module, algorithm, or program) may generate a label of THEFT, indicating that the input data 402 may indicate a personal property or personal articles insurance policy. On the other hand, if natural language processing unit 452 indicates damage to multiple electronics within a home (e.g., due to a power surge), then the neural network may generate a label of COMPREHENSIVE.

It should be appreciated that in this example, the two labels (THEFT and COMPREHENSIVE) are not mutually exclusive. That is, the neural network model (or other machine learning model, module, algorithm, or program) may generate multiple labels corresponding to an indication by pattern matching unit 428 and/or natural language processing unit 430 that both types of insurance coverage are indicated. For example, due to a power surge, electronic locks may be disabled, thus enabling the theft of the personal articles. Further, additional processing, including by the use of an additional neural network model (or other machine learning model, module, algorithm, or program), maybe used to assign weight to a label. For example, an injury of a person who slipped and fell on an ice dam located on the front steps may receive a higher weight than an injury of a person who tripped over his or her own feet and fell in the middle of a room.

The labels in risk indication data 442 may be provided to risk level analysis platform which may perform a calculation using the labels and/or weights. For example, in one embodiment, risk level analysis platform 406 may sum the weights and scale the price of a policy offered to the applicant. In other embodiments, the risk level analysis platform 406 may apply a cut-off level, beyond which no policy may be offered. In yet another embodiment, a maximum and/or minimum weight may be computed, and used to scale a base price. A maximum or minimum weight may correspond to a local maximum (e.g., the deepest or highest level of flood waters measured in a neighborhood), a global maximum (e.g., the homeowner of a set of homeowners with the most claims filed in a five-year period), or a maximum among a set of property owners.

It should be appreciated that there are many possibilities for using the risk-related information generated by the neural network. For example, when claim data related to a real property is received as input data 402 and analyzed using the trained neural network, resulting information that is generated by the neural network and associated with identified risk may include one or more labels (which may be the same or different from input labels), one or more mitigation imperatives or actions that may be taken to reduce risk at the real property, a claim mitigation plan (which may include, for example, multiple mitigation imperatives addressing different risk factors), and the like. The resulting information may be generated directly by the trained neural network, or may be generated by one or more other units (e.g., within the risk level analysis platform 406) operating on output of a trained neural network (or of a chained set of trained neural networks) that is indicative or risk types and/or degrees of risk.

In some embodiments, labels may be associated with pre-set weights that are stored separately from AI platform 404, and which may be updated independently. It should also be appreciated that the methods and techniques described herein may not be applied to seek profit in an insurance marketplace. Rather, the methods and techniques may be used to more fairly and equitably allocate risk among customers in a way that is revenue-neutral, yet which strives for fairness to all market participants, and may only be used on an opt-in basis. For example, a homeowner may opt-in to having telematics data generated by his or her home (and/or various appliances, systems, and components therein) automatically utilized to help set an insurance premium that is more reflective of risk to the home.

Historically, claim losses may be categorized using loss cause codes. These may be a handful of mutually-exclusive labels or categories into which claims are categorized that only permit coarse analysis of risk. However, the methods and systems described herein may help risk-averse customers to lower their insurance premiums by more granularly quantifying risk. The methods and systems may also allow new customers to receive more accurate pricing when they are shopping for real property insurance products. All of the benefits provided by the methods and systems described herein may be realized much more quickly than traditional modeling approaches.

Exemplary Training Model System

Figure 5:
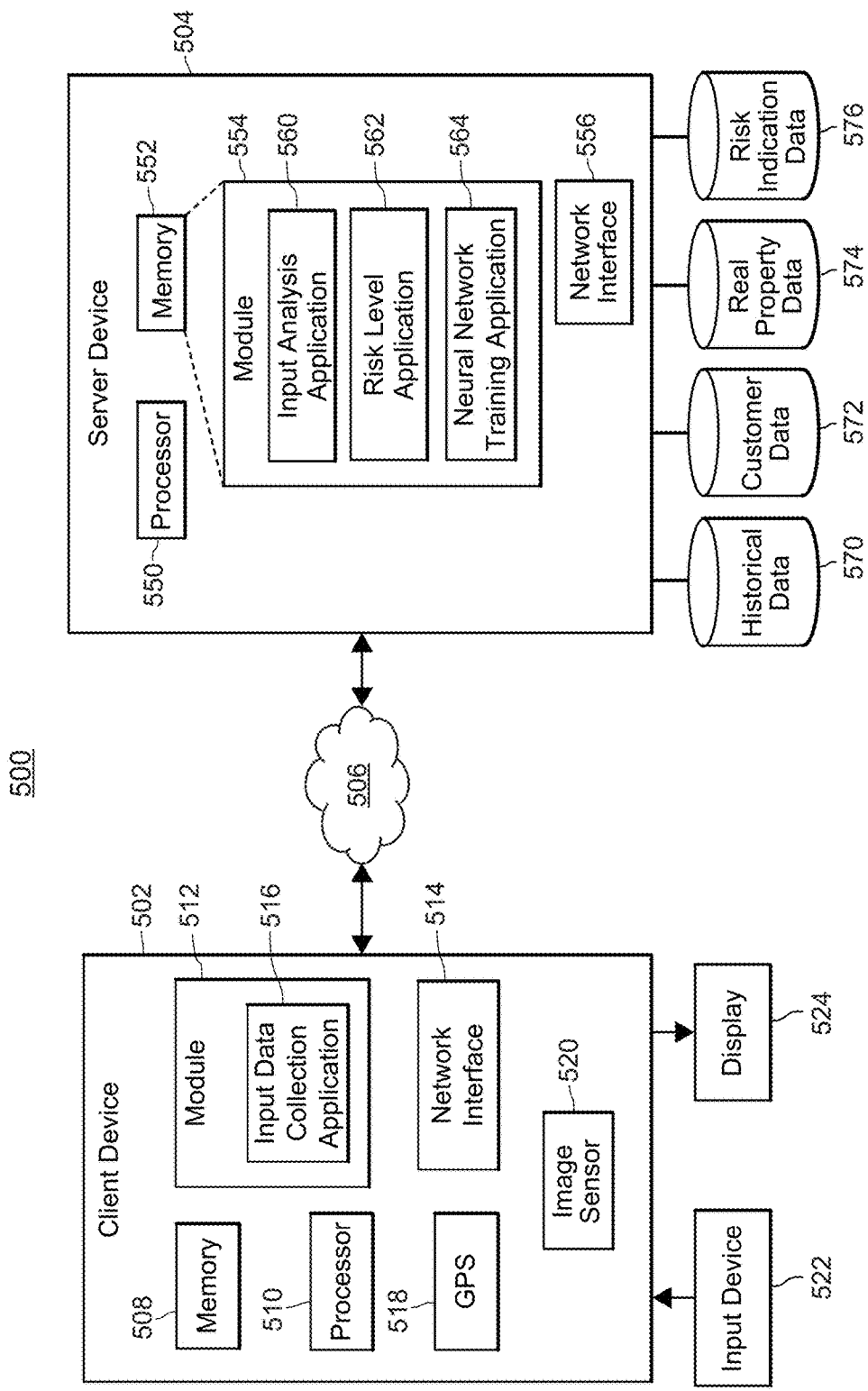
FIG. 5 depicts an exemplary computing environment in which techniques for collecting and processing user input, and training a neural network to identify a risk level of a real property may be implemented, according to one embodiment.

With reference to FIG. 5, a high-level block diagram of real property insurance risk training model system 500 is illustrated that may implement communications between a client device 502 and a server device 504 via network 506 to provide real property insurance loss classification and/or risk level analysis. FIG. 5 may correspond to one embodiment of the system 100 of FIG. 1 and/or the environment 400 of FIG. 4, and also may include various user/client-side components. For simplicity, client device 502 is referred to herein as client 502, and server device 504 is referred to herein as server 504, but either device may be any suitable computing device (e.g., a laptop, smart phone, tablet, server, wearable device, etc.). Indeed, in one embodiment, the client 502 may comprise one or more intelligent monitoring system controllers 106, 106R and/or intelligent monitoring system servers 140 such as shown in FIG. 1. In some implementations, monitoring system server 140 and training model system server 504 may be an integral server, or may be separate and distinct servers that are communicatively connected, e.g., via one or more networks 132. Generally speaking, server 504 may host services relating to neural network training and operation, and may be communicatively coupled to client 502 via network 506.

Although only one client device is depicted in FIG. 5, it should be understood that any number of client devices 502 may be supported. Client device 502 may include a memory 508 and a processor 510 for storing and executing, respectively, a module 512. While referred to in the singular, processor 510 may include any suitable number of processors of one or more types (e.g., one or more CPUs, graphics processing units (GPUs), cores, etc.). Similarly, memory 508 may include one or more persistent memories (e.g., a hard drive and/or solid state memory).

Module 512, stored in memory 508 as a set of computer-readable instructions, may be related to an input data collection application 516 which, when executed by the processor 510, causes input data to be stored in memory 508. The data stored in memory 508 may correspond to, for example, raw data retrieved from input data 402. Input data collection application 516 may be implemented as web page (e.g., HTML, JavaScript, CSS, etc.) and/or as a mobile application for use on a standard mobile computing platform.

Input data collection application 516 may store information in memory 508, including the instructions required for its execution. While the user is using input data collection application 516, scripts and other instructions comprising input data collection application 516 may be represented in memory 508 as a web or mobile application. Additionally or alternatively, while the client device 502 is automatically collecting telematics data generated by one or more real properties, input data collection application 516 may execute, e.g., in the background, of the client device 502. The input data collected by input data collection application 516 may be stored in memory 508 and/or transmitted to server device 504 by network interface 514 via network 506, where the input data may be processed as described above to determine a series of risk indications and/or a risk level. In one embodiment, input data collection application 516 may be data used to train a model (e.g., scanned claim data).

Client device 502 may also include GPS sensor 518, an image sensor 520, user input device 522 (e.g., a keyboard, mouse, touchpad, and/or other input peripheral device), and display interface 524 (e.g., an LED screen). User input device 522 may include components that are integral to client device 502, and/or exterior components that are communicatively coupled to client device 502, to enable client device 502 to accept inputs from the user. Display 524 may be either integral or external to client device 502, and may employ any suitable display technology. In some embodiments, input device 522 and display 524 are integrated, such as in a touchscreen display. Execution of the module 512 may further cause the processor 510 to associate device data collected from client 502 such as a time, date, and/or sensor data (e.g., a camera for photographic or video data) with real property and/or customer data, such as data retrieved from customer data 460 and real property data 462, respectively.

In some embodiments, client 502 may receive data from risk indication data 442 and risk level analysis platform 406. Such data, indicating risk labels and/or a risk level computation, may be presented to a user of client 502 by a display interface 524.

Execution of the module 512 may further cause the processor 510 of the client 502 to communicate with the processor 550 of the server 504 via network interface 514 and network 506. As an example, an application related to module 512, such as input data collection application 516, may, when executed by processor 510, cause a user interface to be displayed to a user of client device 502 via display interface 524. The application may include graphical user input (GUI) components for acquiring data (e.g., photographs) from image sensor 520, GPS coordinate data from GPS sensor 518, and textual user input from user input device(s) 522.

The processor 510 may transmit the aforementioned acquired data to server 504, and processor 550 may pass the acquired data to a neural network (or other machine learning model, module, algorithm, or program), which may accept the acquired data and perform a computation (e.g., training of the model, or application of the acquired data to a trained neural network model (or other machine learning model, module, algorithm, or program) to obtain a result). With specific reference to FIG. 5, the data acquired by client 502 may be transmitted via network 506 to a server implementing AI platform 404, and may be processed by input analysis unit 420 before being applied to a trained neural network (or other machine learning model, module, algorithm, or program) by risk level unit 440.

As described with respect to FIG. 5, the processing of input from client 502 may include associating customer data 460 and real property data 462 with the acquired data. The output of the neural network (or other machine learning model, module, algorithm, or program) may be transmitted, by a risk level unit corresponding to risk level unit 440 in server 504, back to client 502 for display (e.g., in display 524) and/or for further processing.

Network interface 514 may be configured to facilitate communications between client 502 and server 504 via any hardwired or wireless communication network, including network 506 which may be a single communication network, or may include multiple communication networks of one or more types (e.g., one or more wired and/or wireless local area networks (LANs), and/or one or more wired and/or wireless wide area networks (WANs) such as the Internet). Client 502 may cause insurance risk related data to be stored in server 504 memory 552 and/or a remote insurance related database such as customer data 460.

Server 504 may include a processor 550 and a memory 552 for executing and storing, respectively, a module 554. Module 554, stored in memory 552 as a set of computer-readable instructions, may facilitate applications related to processing and/or collecting insurance risk related data, including claim data and claim metadata, and insurance policy application data. For example, module 554 may include input analysis application 560, risk level application 562, and neural network training application 564, in one embodiment.

Input analysis application 560 may correspond to input analysis unit 420 of environment 400 of FIG. 4. Risk level application 562 may correspond to risk level unit 440 of environment of FIG. 4, and neural network training application 564 may correspond to neural network unit 450 of environment 400 of FIG. 4. Module 554 and the applications contained therein may include instructions which, when executed by processor 550, cause server 504 to receive and/or retrieve input data from (e.g., raw data and/or an electronic claim) from client device 502. In one embodiment, input analysis application 560 may process the data from client 502, such as by matching patterns, converting raw text to structured text via natural language processing, by extracting content from images, by converting speech to text, and so on.

Throughout the aforementioned processing, processor 550 may read data from, and write data to, a location of memory 552 and/or to one or more databases associated with server 504. For example, instructions included in module 554 may cause processor 550 to read data from an historical data 570, which may include historical property insurance claim data among other data stored at a data storage area or system, which may be communicatively coupled to server device 504, either directly or via communication network 506. Historical data 570 may correspond to historical data 408, and processor 550 may contain instructions specifying analysis of a series of electronic claim documents from historical data 570, as described above with respect to claims 410-1 through 410-n of historical data 408 in FIG. 4.

Processor 550 may query customer data 572 and real property data 574 for data related to respective electronic claim documents and raw data, e.g., as described with respect to FIG. 4. In one embodiment customer data 572 and real property data 574 correspond, respectively, customer data 460 and real property 462. In another embodiment, customer data 572 and/or real property data 574 may not be integral to server 504. Module 554 may also facilitate communication between client 502 and server 504 via network interface 556 and network 506, in addition to other instructions and functions.

Although only a single server 504 is depicted in FIG. 5, it should be appreciated that it may be advantageous in some embodiments to provision multiple servers for the deployment and functioning of AI system 402. For example, the pattern matching unit 428 and natural language processing unit 430 of input analysis unit 420 may require CPU-intensive processing. Therefore, deploying additional hardware may provide additional execution speed. Each of historical data 570, customer data 572, real property data 574, and risk indication data 576 may be geographically distributed. For example, at least a portion of the server 504 may be implemented using a cloud computing system or other suitable distributed processing system.

While the databases depicted in FIG. 5 are shown as being communicatively coupled to server 504, it should be understood that historical claim data 570, for example, may be located within separate remote servers or any other suitable computing devices communicatively coupled to server 504. For example, at least a portion of the historical claim data 570 may be stored using a cloud data storage system or other suitable distributed data storage system. As such, distributed database techniques (e.g., sharding and/or partitioning) may be used to distribute data. In one embodiment, a free or open source software framework such as Apache Hadoop® may be used to distribute data and run applications (e.g., risk level application 562). It should also be appreciated that different security needs, including those mandated by laws and government regulations, may in some cases affect the embodiment chosen, and configuration of services and components.

In a manner similar to that discussed above in connection with FIG. 4, historical claims from historical claim data 570 may be ingested by server 504 and used by neural network training application 564 to train an artificial neural network (or other machine learning model, module, algorithm, or program). Then, when module 554 processes input from client 502, the data output by the neural network(s) (or other machine learning models, modules, algorithms, or programs) (e.g., data indicating labels, risks, weights, etc.) may be passed to risk level application 562 for computation of an overall risk level, which as discussed, may be expressed in Boolean, decimal, or any other suitable format. The calculated risk level may then be transmitted to client device 502 and/or another device. The calculated risk level may be used for further processing by client device 502, server device 504, or another device.

It should be appreciated that the client/server configuration depicted and described with respect to FIG. 5 is but one possible embodiment. In some cases, a client device such as client 502 may not be used. In that case, input data may be entered—programmatically, or manually—directly into device 504. A computer program or human may perform such data entry. In that case, device may contain additional or fewer components, including input device(s) and/or display device(s).

The most useful embodiment may vary according to the purpose for which the AI platform is being utilized—for example, a different hardware configuration may be preferable if the AI platform is being used to provide a risk analysis to an end user or customer, whereas another embodiment may be preferable if the AI platform is being used to provide risk as part of a backend service. Furthermore, it may be possible to package the trained neural network (or other machine learning model, module, algorithm, or program) for distribution to a client 502 (i.e., the trained neural network may be operated on the client 502 without the use of a server 504).

In operation, the user of client device 502, by operating input device 522 and viewing display 524, may open input data collection application 516, which depending on the embodiment, may allow the user to enter personal information. The user may be an employee of a company controlling AI platform 404 or a customer or end user of the company. For example, input data collection application 516 may walk the user through the steps of submitting a claim.

Before the user can fully access input data collection application 516, the user may be required to authenticate (e.g., enter a valid username and password). The user may then utilize input data collection application 516. Module 512 may contain instructions that identify the user and cause input data collection application 516 to present a particular set of questions or prompts for input to the user, based upon any information input data collection application 516 collects, including without limitation information about the user or any real property.

Further, module 512 may identify a subset of historical data 570 to be used in training a neural network (or other machine learning model, module, algorithm, or program), and/or may indicate to server device 504 that the use of a particular neural network model or models (or other machine learning model, module, algorithm, or program) is appropriate. For example, if the user is applying for earthquake insurance for a particular building, then module 512 may transmit the user's name and personal information, the location of the building to be insured, a photograph of the building to be insured (which may be captured by image sensor 520); and information indicative of building materials and techniques used to construct the building to server device 504.

In some embodiments, location data from client device 502 may be used by a neural network (or other machine learning model, module, algorithm, or program) to label risk, and labels may be linked, in that a first label implies a second label. As noted above, location may be provided to one or more neural networks (or other machine learning models, modules, algorithms, or programs) in the AI platform to generate labels and determine risk. For example, the zip code of a piece of property, whether provided via GPS or entered manually by a user, may cause the neural network (or other machine learning model, module, algorithm, or program) to generate a label applicable to the property such as RURAL, SUBURBAN, or URBAN.

Such qualifications may be used in the calculation of risk, and may be weighted accordingly. For example, the neural network may assign a higher risk weight to the URBAN label, due to the increased likelihood of theft of personal property. Due to the increased risk of theft of personal property, the generation of an URBAN label may be accompanied by additional labels such as THEFT. Alternatively, or in addition, the personal property theft label weight may be increased along with the addition of the URBAN label.

Another label, such as LIGHTNING, may be associated with buildings which the neural network labels as (RURAL, PLAINS). In some embodiments, label generation may be based upon seasonal information, in whole or in part. Additionally or alternatively, the neural network (or other machine learning model, module, algorithm, or program) may generate labels, and/or adjust label weights based upon location provided in input data. For example, the trained neural network model (or other machine learning model, module, algorithm, or program) may learn to associate buildings located on the eastern seaboard of the United States with higher risk during hurricane season.

All other inputs being equal, real property risk may differ based upon the time of year when an applicant is applying for real property insurance. Indeed, using the techniques described herein, risk of a particular real property may vary throughout a calendar year (e.g., based upon seasons and/or weather), and the varying levels of risk may be reflected in varying premium amounts, which may be adjusted throughout the calendar year. It should be appreciated that the quick and automatic generation of such associations is a benefit of the methods and systems disclosed herein, and that some of the associations may appear counter-intuitive when analyzing large data sets.

By the time the user of client 502 submits an application for real property insurance or files a claim, server 504 may have already processed the electronic claim records in historical data 570 and trained a neural network model (or other machine learning model, module, algorithm, or program) to analyze the information provided by the user to output risk indications, labels, and/or weights.

For example, a homeowner may access client 502 to submit a claim under the homeowner's insurance policy related to damage to the home's kitchen due to a cooking fire. Client 502 may collect information from the homeowner related to the circumstances of the cooking fire in addition to demographic information of the home (e.g., smoke detectors, auto-shut-off of appliances, sprinkler system, etc.), such as photographs from image sensor 520, dynamic telematics data provided by the home's monitoring system in the period of time during which the cooking fire occurred, historical telematics data over time, etc. In some embodiments, the homeowner may be prompted to make a telephone call to discuss the filing of the claim, which may be recorded and later provided to server 504. Additionally or alternatively, a report generated by the fire department that put out the fire and/or corresponding 911 call records may be obtained and provided to the server 504.

All of the information collected may be associated with a claim identification number so that it may be referenced as a whole. Server 504 may process the information as it arrives, and thus may process information collected by input data collection application 516 at a different time than server 504 processes the audio recording, the current and historical home telematics data, the fire department report, and the 911 call records in the above example. Once information sufficient to process the claim has been collected, server 504 may pass all of the processed information (e.g., from input analysis application) to risk level application 562, which may apply the information to the trained neural network model (or other machine learning model, module, algorithm, or program).

While the claim or application processing is pending, client device 502 may display an indication that the processing of the claim is ongoing and/or incomplete. When the claim is ultimately processed by server 504, an indication of completeness may be transmitted to client 502 and displayed to user, for example via display 524. Missing information may cause the model to abort with an error.

In some embodiments, the labels and/or characterization of input data (claims and otherwise) performed by the systems and methods described herein may be capable of dynamic, incremental, and or online training. Specifically, a model that has been trained on a set of electronic claim records from historical data 570 may be updated dynamically, such that the model may be updated on a much shorter time scale. For example, the model may be adjusted weekly or monthly to take into account newly-settled claims.

In one embodiment, the settlement of a claim may trigger an immediate update of one or more neural network models (or other machine learning model, module, algorithm, or program) included in the AI platform. For example, the settlement of a claim involving roof and gutter repair due to the weight of ice and snow may trigger updates to a set of neural network models (or other machine learning models, modules, algorithms, or programs) pertaining to coverage due to ice and snow weight for a particular geographical regions. In addition, or alternatively, as new claims are filed and processed, new labels may be dynamically generated, based upon risks identified and generated during the training process. In some embodiments, a human reviewer or team of reviewers may be responsible for approving the generated labels and any associated weightings before they are used.

In some embodiments, AI platform 404 may be trained and/or updated to provide one or more dynamic insurance rating models which may be provided to, for example, a governmental agency. As discussed above, models are historically difficult to update and updates may be performed on a yearly basis. Using the techniques described herein, models may be dynamically updated in real-time, or on a shorter schedule (e.g., weekly) based upon new claim data.

While FIG. 5 depicts a particular embodiment, the various components of environment 500 may interoperate in a manner that is different from that described above, and/or the environment 500 may include additional components not shown in FIG. 5. For example, an additional server/platform may act as an interface between client device 502 and server device 504, and may perform various operations associated with providing the labeling and/or risk analysis operations of server 504 to client device 502 and/or other servers.

Exemplary Artificial Neural Network

Figure 6:
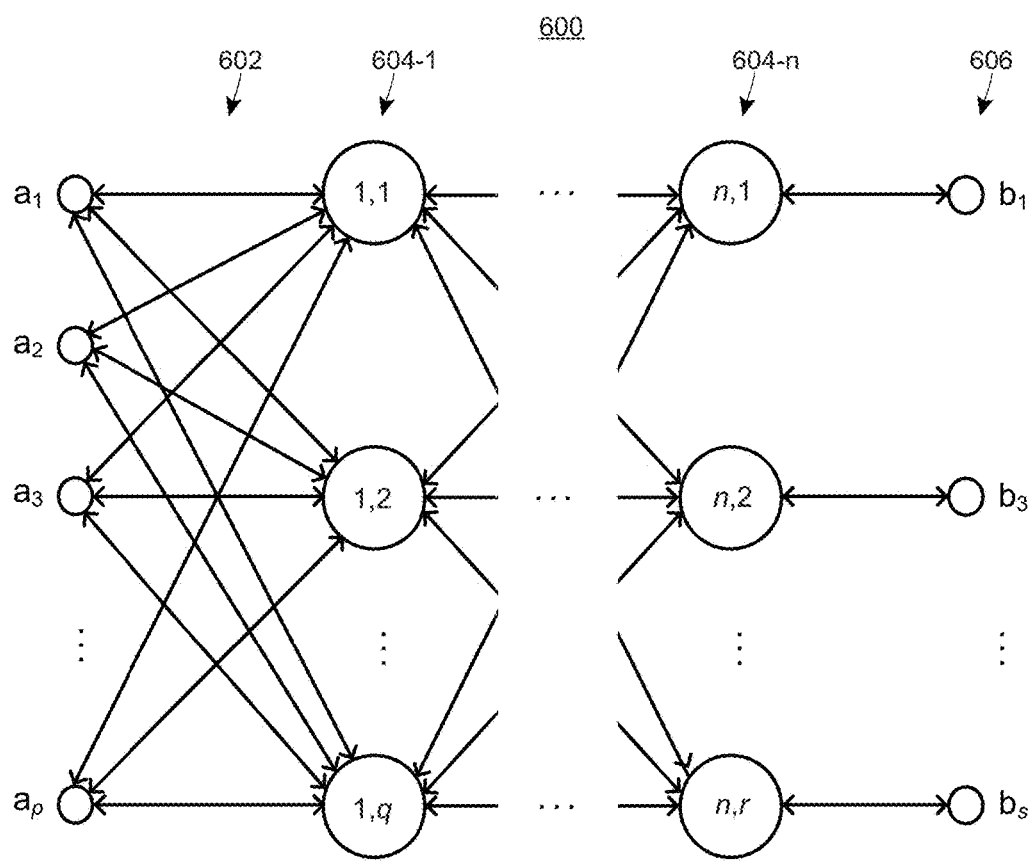
FIG. 6 depicts an exemplary artificial neural network which may be trained by the neural network unit of FIG. 4 or the neural network training application of FIG. 5, according to one embodiment and scenario.

FIG. 6 depicts an exemplary artificial neural network 600 which may be trained by neural network unit 450 of FIG. 4 or neural network training application 564 of FIG. 5, according to one embodiment and scenario. The example neural network 600 may include layers of neurons, including input layer 602, one or more hidden layers 604-1 through 604-*n*, and output layer 606. Each layer comprising neural network 600 may include any number of neurons—i.e., q and r may be any positive integers. It should be understood that neural networks may be used to achieve the methods and systems described herein that are of a different structure and configuration than those depicted in FIG. 6.

Input layer 602 may receive different input data. For example, input layer 602 may include a first input $a_1$ which represents an insurance type for property (e.g., dwelling), a second input $a_2$ representing patterns identified in input data, a third input $a_3$ representing a type of dwelling or building, a fourth input $a_4$ representing one or materials from which the dwelling or building is constructed, a fifth input $a_5$ representing whether a claim was paid or not paid, a sixth input $a_6$ representing an inflation-adjusted dollar amount disbursed under a claim, and so on. Input layer 602 may comprise thousands or more inputs. In some embodiments, the number of elements used by neural network 600 may change during the training process, and some neurons may be bypassed or ignored if, for example, during execution of the neural network, they are determined to be of less relevance.

Each neuron in hidden layer(s) 604-1 through 604-*n* may process one or more inputs from input layer 602, and/or one or more outputs from a previous one of the hidden layers, to generate a decision or other output. Output layer 606 may include one or more outputs each indicating a label, confidence factor, and/or weight describing one or more inputs. A label may indicate the presence (ROOF, HAIL) or absence (DROUGHT) of a condition. In some embodiments, however, outputs of neural network 600 may be obtained from a hidden layer 604-1 through 604-*n* in addition to, or in place of, output(s) from output layer(s) 606.

In some embodiments, each layer may have a discrete, recognizable, function with respect to input data. For example, if n=3, a first layer may analyze one dimension of inputs, a second layer a second dimension, and the final layer a third dimension of the inputs, where all dimensions are analyzing a distinct and unrelated aspect of the input data. For example, the first dimension may correspond to aspects of a real property that are considered as strongly determinative, then the second dimension may correspond to those that are considered of intermediate importance, and finally the third dimension may correspond to those that are of less relevance.

In other embodiments, the layers may not be clearly delineated in terms of the functionality they respectively perform. For example, two or more of hidden layers 604-1 through 604-*n* may share decisions relating to labeling, with no single layer making an independent decision as to labeling.

In some embodiments, neural network 600 may be constituted by a recurrent neural network, wherein the calculation performed at each neuron is dependent upon a previous calculation. It should be appreciated that recurrent neural networks may be more useful in performing certain tasks, such as automatic labeling of images. Therefore, in one embodiment, a recurrent neural network may be trained with respect to a specific piece of functionality with respect to environment 400 of FIG. 4. For example, in one embodiment, a recurrent neural network may be trained and utilized as part of image processing unit 424 to automatically label images.

Figure 7:
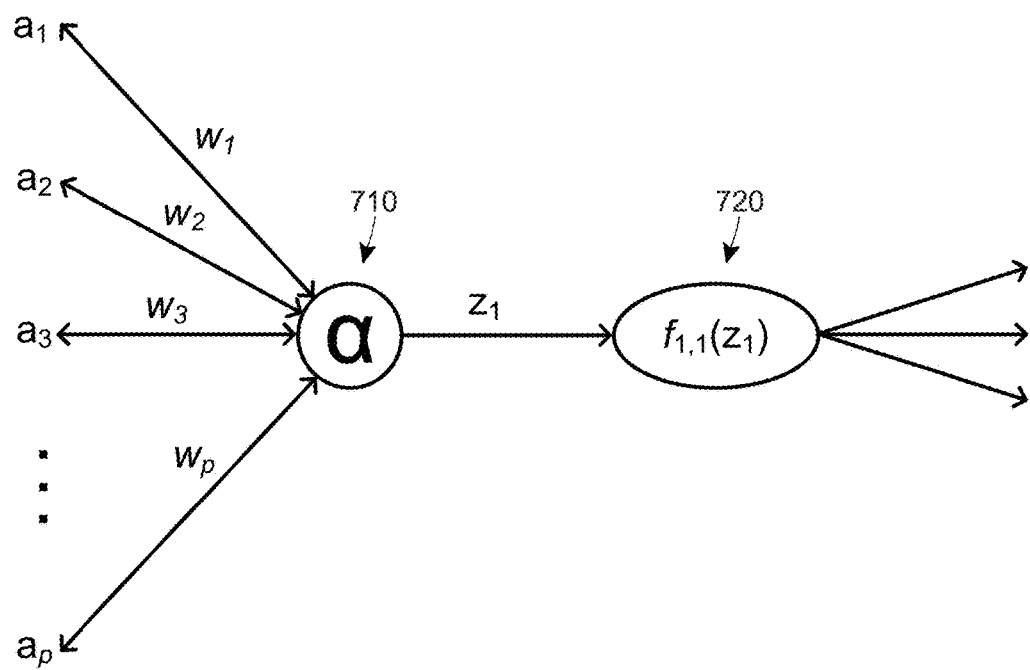
FIG. 7 depicts an exemplary neuron, which may be included in the artificial neural network of FIG. 6, according to one embodiment and scenario.

FIG. 7 depicts an example neuron 700 that may correspond to the neuron labeled as "1,1" in hidden layer 604-1 of FIG. 6, according to one embodiment. Each of the inputs to neuron 700 (e.g., the inputs comprising input layer 602) may be weighted, such that input $a_1$ through $a_p$ corresponds to weights $w_1$ through $w_p$, as determined during the training process of neural network 600.

In some embodiments, some inputs may lack an explicit weight, or may be associated with a weight below a relevant threshold. The weights may be applied to a function $\alpha$ 710, which may be a summation and may produce a value $z_1$ which may be input to a function 720, labeled as $f_{1,1}(z_1)$. The function 720 may be any suitable linear or non-linear, or sigmoid, function. As depicted in FIG. 7, the function 720 may produce multiple outputs, which may be provided to neuron(s) of a subsequent layer, or used directly as an output of neural network 600. For example, the outputs may correspond to index values in a dictionary of labels, or may be calculated values used as inputs to subsequent functions.

It should be appreciated that the structure and function of the neural network 600 and neuron 700 depicted are for illustration purposes only, and that other suitable configurations may exist. For example, the output of any given neuron may depend not only on values determined by past neurons, but also future neurons.

Exemplary Processing of a Claim

The specific manner in which the one or more neural networks employ machine learning to label and/or quantify risk may differ depending on the content and arrangement of training documents within the historical data (e.g., historical data 408 of FIG. 4 and historical data 570 of FIG. 5) and the input data provided by customers or users of the AI platform (e.g., input data 402 of FIG. 4 and the data collected by input data collection application 516 of FIG. 5), as well as the data that is joined to the historical data and input data, such as customer data 450 of FIG. 4 and customer data 572 of FIG. 5, and real property data 462 of FIG. 4 and real property data 574 of FIG. 5.

The initial structure of the neural networks (e.g., the number of neural networks, their respective types, number of layers, and neurons per layer, etc.) may also affect the manner in which the trained neural network processes the input and claims. Also, as noted above, the output produced by neural networks may be counter-intuitive and very complex. For illustrative purposes, intuitive and simplified examples will now be discussed in connection with FIG. 8.

Figure 8:
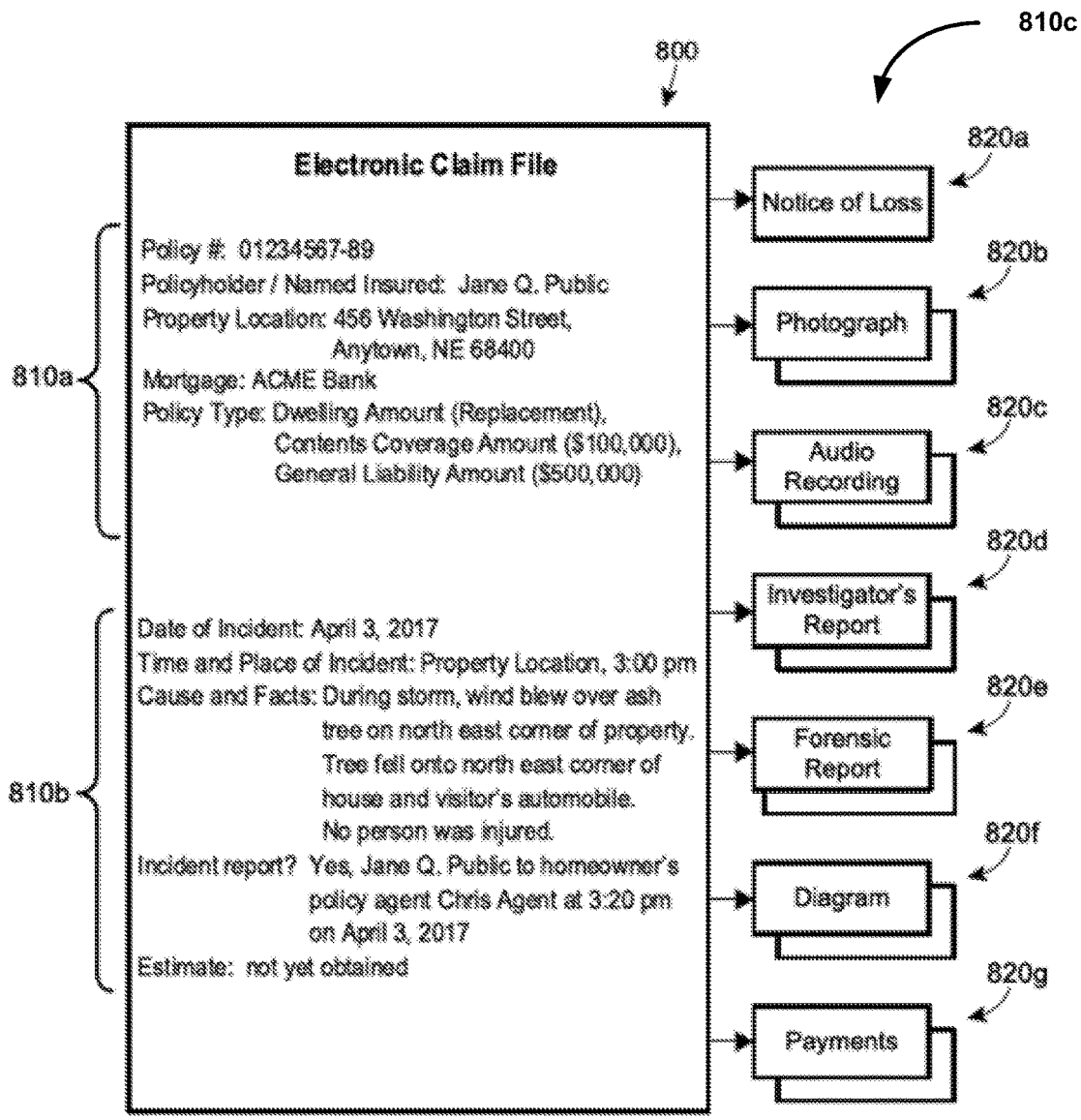
FIG. 8 depicts text-based content of an exemplary electronic claim record that may be processed by an artificial neural network, in one embodiment.

FIG. 8 depicts text-based content of an example electronic claim record 800 which may be processed using an artificial neural network, such as neural network 600 of FIG. 6 or a different neural network generated by neural network unit 450 of FIG. 4 or neural network training application 564 of FIG. 5. The term "text-based content" as used herein includes printing (e.g., characters A-Z and numerals 0-9), in addition to non-printing characters (e.g., whitespace, line breaks, formatting, and control characters). Text-based content may be in any suitable character encoding, such as ASCII or UTF-8 and text-based content may include HTML.

Although text-based-content is depicted in the embodiment of FIG. 8, as discussed above, claim input data may include images, including hand-written notes, and the AI platform may include a neural network (or other machine learning model, module, algorithm, or program) trained to recognize hand-writing and to convert hand-writing to text. Further, "text-based content" may be formatted in any acceptable data format, including structured query language (SQL) tables, flat files, hierarchical data formats (e.g., XML, JSON, etc.) or as other suitable electronic objects. In some embodiments, image and audio data may be fed directly into the neural network(s) without being converted to text first.

With respect to FIG. 8, electronic claim record 800 includes three sections 810a-810c, which respectively represent policy information, loss information, and external information. Policy information 810a may include information about the insurance policy under which the claim has been made, including the person to whom the policy is issued, the address of the insured property, the different types of property coverages (e.g., dwelling, contents, liability, etc.). Policy information 810a may be read, for example by input analysis unit 420 analyzing historical data such as historical data 408 and individual claims, such as claims 410-1 through 410-n.

Additional information about the insured property (e.g., location, type of property, year of construction, square footage, building materials, historical claim data, historical telematics data, etc.) may be obtained from data sources and joined to input data. For example, additional customer data may be obtained from customer data 450 and/or customer data 572, and additional real property data may be obtained from real property data 452 and/or real property data 574. In some embodiments, at least in addition to policy information 810a, electronic claim record 800 may include loss information 810b. Loss information generally corresponds to information regarding a loss event in which a real property covered by the policy listed in policy information 810a sustained loss, and may be due to an accident, weather conditions, failure of building component (such as a pipe or electrical circuit), theft, fire, or other peril. Loss information 810b may indicate the date and time of the loss, the type of loss (e.g., damage, total loss, theft, etc.), whether personal injury occurred, whether the insured made a statement in connection with the loss, whether the loss was settled, and if so for how much money. Some real property information may be included in electronic claim record 800, and the additional lookup may be of real property attributes (e.g., building materials, square footage, etc.).

In some embodiments, more the than one loss may be represented in loss information 810b. For example, a single event may give rise to multiple losses under a given policy, for example, when a tree on the property falls and damages a part of the building as well as a visitor's automobile parked on the property. In addition to loss information, electronic claim record 800 may include external information 810c, including but not limited to correspondence with the homeowner, statements made by the visitor, before and after photographs or images, etc. External information 810c may be textual, audio, or video information. The information may include file name references, or may be file handles or addresses that represent links to other files or data sources, such as linked data 820a-g. It should be appreciated that although only links 820a-g are shown, more or fewer links may be included, in some embodiments.

Electronic claim record 800 may include links to other records, including other electronic claim records. For example, electronic claim record 800 may link to notice of loss 820a, one or more photographs 820b, one or more audio recordings 820c, one or more investigator's reports 820d, one or more forensic reports 820e, one or more diagrams 820f, and one or more payments 820g. Data in links 820a-820g may be ingested by an AI platform such as AI platform 420. For example, as described above, each claim may be ingested and analyzed by input analysis unit 420.

AI platform 404 may include instructions which cause input analysis unit 420 to retrieve, for each link 820a-820g, all available data or a subset thereof. Each link may be processed according to the type of data contained therein; for example, with respect to FIG. 4, input analysis unit 420 may process, first, all images from one or more photograph 820b using image processing unit 424. Input analysis unit 420 may process audio recording 820c using speech-to-text unit 422.

In some embodiments, a relevance order may be established, and processing may be completed according to that order. For example, portions of a claim that are identified as most dispositive of risk may be identified and processed first. If, in that example, they are dispositive of pricing, then processing of further claim elements may be abated to save processing resources. In one embodiment, once a given number of labels is generated (e.g., 50) processing may automatically abate.

Once the various input data comprising electronic claim record 800 has been processed, the results of the processing may, in one embodiment, be passed to a text analysis unit, and then to neural network (or other machine learning model, module, algorithm, or program). If the AI platform is being trained, then the output of input analysis unit 420 may be passed directly to neural network unit 450. The neurons comprising a first input layer of the neural network being trained by neural network unit 450 may be configured so that each neuron receives particular input(s) which may correspond, in one embodiment, to one or more pieces of information from policy information 810a, loss information 810b, and external information 810c.

Similarly, one or more input neurons may be configured to receive particular input(s) from links 820a-820g. If the AI platform is being used to accept input to predict a claim value during the claims filing process, or to estimate the risk posed by a new customer during the application process, then the processing may begin with the use of an input collection application, as discussed with respect to one embodiment in FIG. 8.

In some embodiments, analysis of input entered by a user may be performed on a client device, such as client device 502. In that case, output from input analysis may be transmitted to a server, such as server 504, and may be passed directly as input to neurons of an already-trained neural network, such as a neural network trained by neural network training application 564.

In one embodiment, the value of a new claim may be predicted directly by a neural network model (or other machine learning model, module, algorithm, or program) trained on historical data 408, without the use of any labeling. For example, a neural network (or other machine learning model, module, algorithm, or program) may be trained such that input parameters correspond to, for example, policy information 810a, loss information 812b, external information 812c, and linked information 820a-820g.

The trained model may be configured so that inputting sample parameters, such as those in the example electronic claim record 800, may accurately predict, for example, the estimate of damage ($95,000) and settled amount ($94,500). In this case, random weights may be chosen for all input parameters.

The model may then be provided with training data from claims 410-1 through 410-n, which are each pre-processed by the techniques described herein with respect to FIGS. 4 and 5 to extract individual input parameters. The electronic claim record 800 may then be tested against the model, and the model trained with new training data claims, until the predicted dollar values and the correct dollar values converge.

In one embodiment, the AI platform may modify the information available within an electronic claim record. For example, the AI platform may predict a series of labels as described above that pertain to a given claim. The labels may be saved in a risk indication data store, such as risk indication data 442 with respect to FIG. 4. Next, the labels and corresponding weights, in one embodiment, may be received by risk level analysis platform 406, where they may be used in conjunction with base rate information to predict a claim loss value.

In some embodiments, information pertaining to the claim, such as the coverage amount and real property type from policy information 810a, may be passed along with the labels and weights to risk analysis platform 406 and may be used in the computation of a claim loss value. After the claim loss value is computed, it may be associated with the claim, for example by writing the amount to the loss information section of the electronic claim record (e.g., to the loss information section 810b of FIG. 8).

As noted above, the methods and systems described herein may be capable of analyzing decades of electronic claim records to build neural network models or train other machine learning models, and the formatting of electronic claim records may change significantly from decade to decade, even year to year. Therefore, it is important to recognize that the flexibility built into the methods and systems described herein allows electronic claim records in disparate formats to be consumed and analyzed.

Exemplary Computer-Implemented Methods

Figure 9:
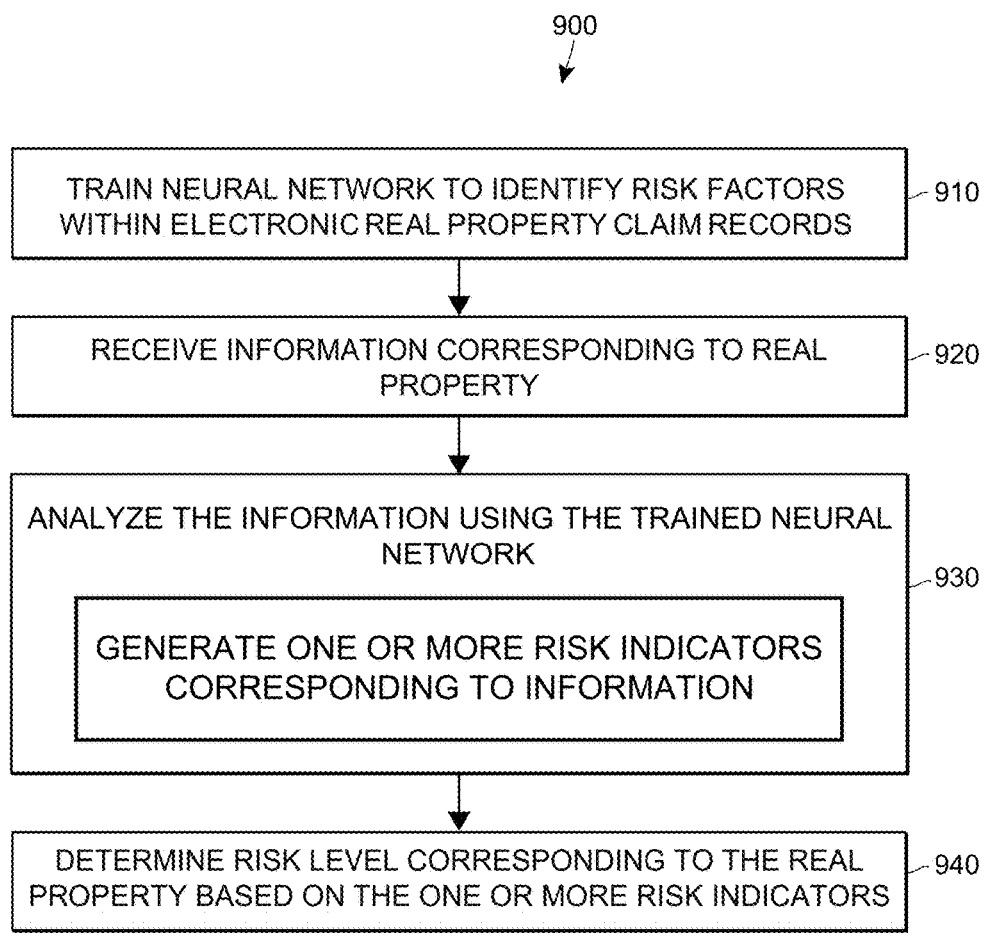
FIG. 9 depicts a flow diagram of an exemplary computer-implemented method of determining a risk level posed by a particular real property, according to one embodiment.

Turning to FIG. 9, an exemplary computer-implemented method 900 for determining a risk level posed by a particular real property is depicted. The method 900 may include training a neural network to identify risk factors within electronic insurance claim records corresponding to the particular real property and/or to the owners of the particular real property (e.g., by an AI platform such as AI platform 404 training a neural network (or other machine learning model, module, algorithm, or program) by an input analysis unit 420 processing data before passing the results of the analysis to a training unit 452 that uses the results to train a neural network model (or other machine learning model, module, algorithm, or program)) (block 910). The method 900 may include receiving information corresponding to the particular real property by an AI platform (e.g., the AI platform 404 may accept input data such as input data 402 and may process that input by the use of an input analysis unit such as input analysis unit 420) (block 920). The method 900 may include analyzing the information using the trained neural network (e.g., a risk indication unit 454 applies the output of the input analysis unit 420 to trained neural network model (or other machine learning model, module, algorithm, or program)) to generate one or more risk indicators corresponding to the information (e.g., the neural network produces a plurality of labels and/or corresponding weights) (block 930) which are used to determine a risk level corresponding to the particular real property based upon the one or more risk indicators (e.g., risk indications are stored in risk indication data 442, and/or passed to risk level analysis platform 406 for computation of a risk level, which may be based upon weights also generated by the trained neural network (or other machine learning model, module, algorithm, or program)) (block 940). The method may include additional, less, or alternate actions, including those discussed elsewhere herein.

Turning to FIG. 10, a flow diagram for an exemplary computer-implemented method 1000 of determining risk indicators from real property information. The method 1000 may be implemented by a processor (e.g., processor 550) executing, for example, a portion of AI platform 404, including input analysis unit 420, pattern matching unit 428, natural language processing unit 130, and neural network unit 150. In particular, the processor 520 may execute an input data collection application 516 and an input device 522 to cause the processor 525 to acquire application input 1010 from a user of a client 502 and/or automatically from the client 502 (such as when the client 502 is included in an intelligent building monitoring system 100).

The processor 510 may further execute the input data collection application 516 to cause the processor 510 to transmit application input 1010 from the user via network interface 514 and a network 506 to a server (e.g., server 504). Processor 550 of server 504 may cause module 554 of server 504 to process application input 1010. Input analysis application 560 may analyze application input 1010 according to the methods describe above. For example, real property information may be queried from real property data such as real property data 574. An address or other geographical indication of the real property in application input 1010 may be provided as a parameter to real property data 574.

Real property data 574 may return a result indicating that a corresponding real property was found in real property data 574, and that it is a vacation rental home located in on the Eastern seaboard of the United States. Similarly, the purpose provided in application input 1010 may be provided to a natural language processing unit (e.g., NLP unit 130), which may return a structured result indicating that the real property is owned by a company that owns and rents out multiple vacation rental homes in the area. The result of processing the application input 1010 may be provided to a risk level unit (e.g., risk level unit 140) which will apply the input parameters to a trained neural network model (or other trained machine learning model, module, algorithm, or program).

In one embodiment, the trained neural network model (or other machine learning model, module, algorithm, or program) may produce a set of labels and confidence factors 1020. The set of labels and confidence factors 1020 may contain labels that are inherent in the application input 1010 (e.g., RENTAL-PROPERTY) or that are queried based upon information provided in the application input 1010 (e.g., BEACHFRONT, based upon address). However, the set of labels and confidence factors 1020 may include additional labels (e.g., HURRICANE SHUTTERS and RAISED STRUCTURE) that are not evident from the application input 1010 or any related/queried information. After being generated by the neural network (or other machine learning model, module, algorithm, or program), the set of labels and confidence factors 1020 may then be saved to an electronic database such as risk indication data 576, and/or passed to a risk level analysis platform 106, whereupon a total risk may be computed and used in a pricing quote provided to the user of client 502.

It should be appreciated that many more types of information may be extracted from the application input 1010 (e.g., from example links 520*a*-520*g* as shown in FIG. 8). In one embodiment, the pricing quote may be a weighted average of the products of label weights and confidences. The method 1000 may be implemented, for example, in response to a party accessing client 502 for the purpose of applying for an insurance policy, or adding (via an application) an additional insured to an existing policy. The method may include additional, less, or alternate actions, including those discussed elsewhere herein.

Figure 11:
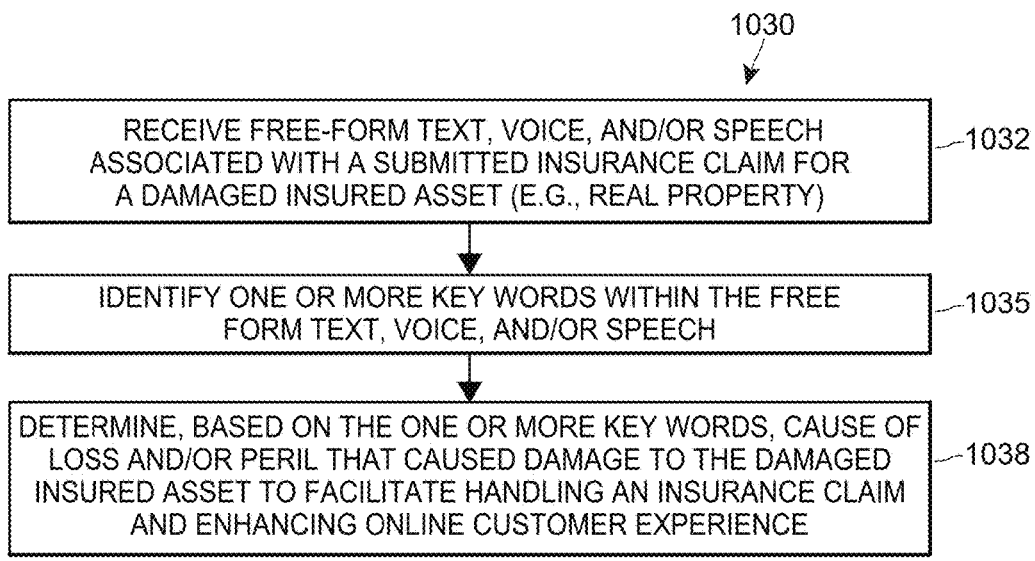
FIG. 11 depicts a flow diagram of an example computer-implemented method of detecting and/or estimating damage to real property, according to one embodiment.

FIG. 11 depicts a flow diagram of an exemplary computer-implemented method 1030 of detecting and/or estimating damage to real property. In one embodiment, one or more processors, servers, sensors, and/or transceivers are configured to perform at least a portion of the method 1030. For example, at least a portion of the method 1030 may be performed by one or more components of the system 100, the system 400, and/or the system 500. Additionally or alternatively, in some implementations, the method 1030 may operate in conjunction with one or more portions of one or more other methods described elsewhere herein.

At any rate, at a block 1032, the method 1030 may include receiving free form text, voice, and/or speech associated with a submitted insurance claim for a damaged insured asset, where the damaged insured asset comprises a building, home, or another type of real property. For example, one or more processors and/or associated transceivers (such as via wired communication or data transmission, and/or via wireless communication or data transmission over one or more radio links or communication channels) may receive the free form text, voice, and/or speech. The free-form text or voice/speech may be associated with or input via webpage accessed by customer or by an insurance agent, for example, or via an Internet page accessed by call center representative.

Additionally, at a block 1035, the method 1030 may include identifying, e.g., via the one or more processors, one or more key words within the free form text or voice/speech. The one or more key words may be or may be associated with, for example, fire, smoke, wind, hail, water, storm surge, tornado, hurricane, electrical, plumbing, property damage, liability, medical, ambulance, materials, cabinets, fireplace, bathroom, bedroom, kitchen, upstairs, roof, downstairs, basement, structure or structural components, security system, appliance, refrigerator, washer, dryer, oven, stove, and/or lightning, to name a few. In one embodiment, the free-form text or voice/speech may be input into a processor that has and/or executes a first machine learning algorithm that is trained to accept, example, at least one type of free from text or voice/speech and/or an indication of at least one type of insured asset, and to identify at least one keyword associated with the previous word at least one respective cause of loss and/or peril based upon the accepted input. The first machine learning algorithm may be dynamically or continuously updated or trained to dynamically update a set of keywords associated with at least one respective cause of loss and/or peril, if desired.

At a block 1038, the method 1030 may include determining, e.g., via the one or more processors, a cause of loss and/or peril that caused damage to the damaged insured asset to facilitate handling an insurance claim and enhancing online customer experience. The determination may be made at the block 1038 based upon the one or more keywords, for example, and the cause of loss and/or peril may be wind, water, storm surge, smoke, fire, hail, hurricane, tornado, etc. In one embodiment, the block 1038 may include inputting the one or more keywords into a processor having a second machine learning algorithm that is trained to accept, as input, at least one keyword and/or an indication of at least one type of insured asset, and to identify at least one respective cause of loss and/or peril based upon the accepted input. In some scenarios, the second machine learning algorithm may be dynamically or continuously updated or trained to dynamically update a set of causes of loss and/or perils.

Further, in some implementations (not shown in FIG. 11), the method 1030 may additionally include retrieving or receiving, e.g., via the one or more processors and/or transceivers, an insurance policy associated with the damaged insured asset, and/or determining whether or not the determined cause of loss and/or peril is covered under the insurance policy. Still further, in some implementations (also not shown in FIG. 11), the method 1030 may include receiving, e.g., via the one or more processors and/or transceivers, one or more images of the damaged insured asset (such digital or electronic images acquired via a mobile device or smart home controller), analyzing the one or more images to determine a second cause of loss and/or peril, and comparing the second cause of loss or peril with the first determined cause of loss and/or to verify an accuracy of the submitted insurance claim or to identify potential fraud or build up. For example, at least some of the received images may be input into a machine learning algorithm trained to accept images of assets as input and determine a cause of loss and/or peril and/or to generate damage estimates and/or repair/replacement costs for the asset based upon the accepted images.

Figure 12:
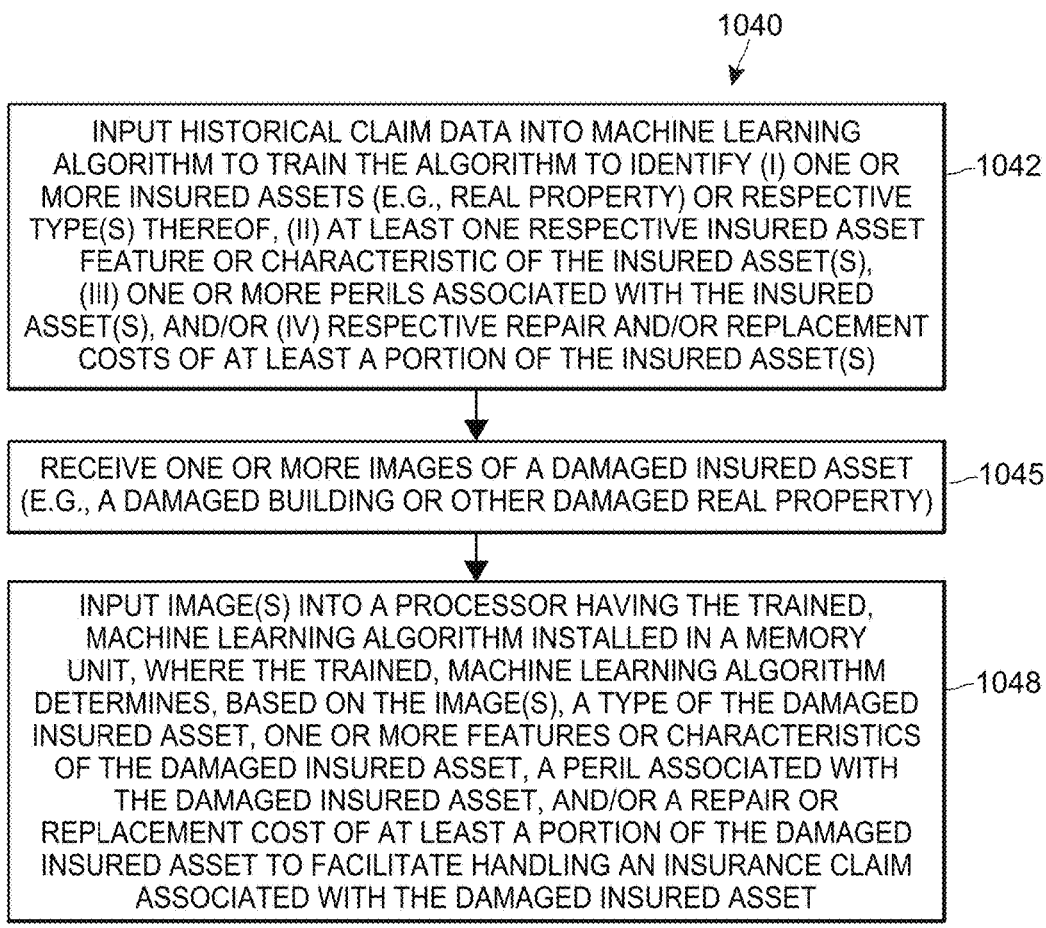
FIG. 12 illustrates a flow diagram of an exemplary computer-implemented method of determining damage to property that may operate in accordance with the described embodiments.

FIG. 12 depicts a flow diagram of a computer-implemented method 1040 of determining damage to property. In one embodiment, one or more processors, servers, sensors, and/or transceivers are configured to perform at least a portion of the method 1040. For example, at least a portion of the method 1040 may be performed by one or more components of the system 100, the system 400, and/or the system 500. Additionally or alternatively, in some implementations, the method 1040 may operate in conjunction with one or more portions of one or more other methods described elsewhere herein.

The method 1040 may include inputting (block 1042), e.g., via one or more processors, historical property insurance claim data into a machine learning algorithm to train the algorithm to identify one or more insured assets (and/or respective types thereof), one or more respective insured asset features or characteristics, one or more perils associated with the one or more insured assets, and/or respective repair or replacement costs of at least a portion of the one or more insured assets. The one or more insured assets may include one or more buildings and/or types of real property, for example, a house or a home, and the one or more features or characteristics of the damaged insured asset may include location, square footage, cabinet type, roof type, siding type, type of fireplace, and/or material type, to name a few. At a block 1045, the method 1040 may include receiving one or more images, such as one or more digital images acquired via a mobile device or smartphone or a smart home controller, of a damaged insured asset that is or includes real property (such as images submitted by the insured via a webpage). The one or more images of the damaged insured asset may be received (block 1045) via the one or more processors and/or one or more transceivers (such as via wired communication or data transmission, and/or via wireless communication or data transmission over one or more radio links or communication channels), for example. Additionally, the method 1040 may include inputting (block 1048), e.g., via one or more processors, the images of the damaged insured asset into a processor having or having access to the trained machine learning algorithm installed in a memory unit. The trained machine learning algorithm may, based upon the input, determine a type of the damaged insured asset, one or more features or characteristics of the damaged insured asset, a peril associated with the damaged insured asset, and/or a repair or replacement cost of at least a portion of the damaged insured asset to facilitate handling an insurance claim associated with the damaged insured asset. The peril associated with the damaged insured asset may be at least one of fire, smoke, water, hail, wind, storm surge, hurricane, or tornado.

Further, in some implementations (not shown in FIG. 12), the method 1040 may additionally include retrieving or receiving, e.g., via the one or more processors and/or transceivers, an insurance policy associated with the damaged insured asset, and/or determining whether or not the determined cause of loss and/or peril is covered under the insurance policy.

Figure 13:
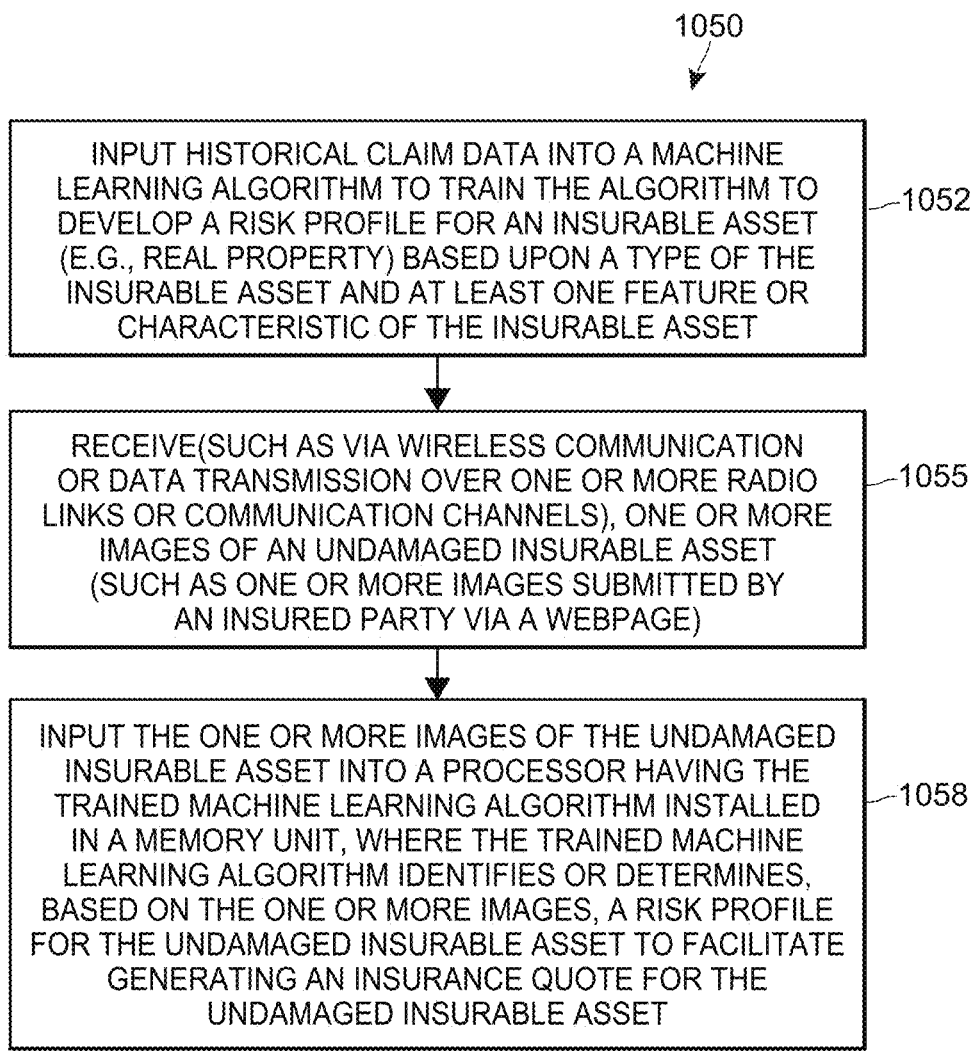
FIG. 13 illustrates a block diagram of an exemplary computer system configured to detect and/or estimate damage to real property, where the computer system may be included in the system of FIG. 1.

FIG. 13 depicts a flow diagram of a computer-implemented method 1050 for determining damage to real property. In one embodiment, one or more processors, servers, sensors, and/or transceivers are configured to perform at least a portion of the method 1050. For example, at least a portion of the method 1050 may be performed by one or more components of the system 100, the system 400, and/or the system 500. Additionally or alternatively, in some implementations, the method 1050 may operate in conjunction with one or more portions of one or more other methods described elsewhere herein.

At a block 1052, the method 1050 may include inputting historical claim data into a machine learning algorithm to train the algorithm to develop a risk profile for an insurable asset based upon a type of the insurable asset and at least one feature or characteristic of the insurable asset, where the insurable asset comprises real property, such as a house or home. The at least one feature characteristic of the insurable asset may include, for example, at least one of location, square footage, cabinet type, roof type, siding type, type of fireplace, type of windows, or material type, to name a few. At a block 1055, the method 1050 may further include receiving (such as via wired communication or data transmission, and/or via wireless communication or data transmission over one or more radio links or communication channels), one or more images, such as a digital image acquired via a mobile device or smart home controller, of an undamaged insurable asset (such as one or more images submitted by an insured party via a webpage, website, mobile device, and/or smart home controller). Additionally, at a block 1058, the method 1050 may include inputting the one or more images of the undamaged insurable asset into a processor having the trained machine learning algorithm installed in a memory unit (block 1058). The trained machine learning algorithm may, based upon the one or more images, identify or determine a risk profile for the undamaged insurable asset to facilitate generating an insurance quote for the undamaged insurable asset.

In one embodiment (not shown in FIG. 13), the method 1050 may include generating an insurance policy and/or determining an insurance rate for the undamaged insurable asset based at least in part upon the risk profile developed for the undamaged insurable asset. For example, the insurance rate may include a usage-based insurance (UBI) rate. The insurance policy and/or the insurance rate may be electronically transmitted to an owner of the undamaged insurable asset for review and/or approval, which may be provided by the owner electronically, if desired.

Figure 14:
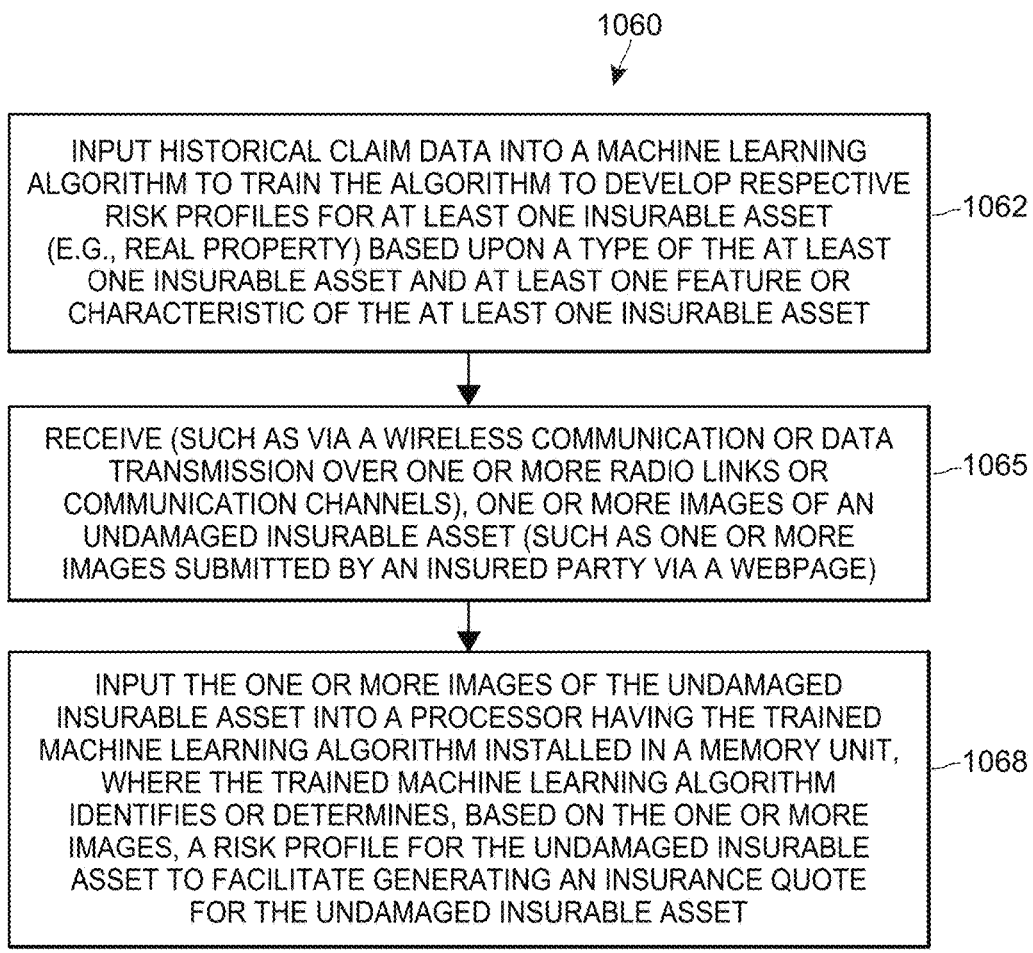
FIG. 14 illustrates a block diagram of an exemplary computer system configured to determine damage to real property, where the computer system may be included in the system of FIG. 1.

FIG. 14 depicts a flow diagram of an example computer-implemented method 1060 for determining damage to real property. In one embodiment, one or more processors, servers, sensors, and/or transceivers are configured to perform at least a portion of the method 1060. For example, at least a portion of the method 1060 may be performed by one or more components of the system 100, the system 400, and/or the system 500. Additionally or alternatively, in some implementations, the method 1060 may operate in conjunction with one or more portions of one or more other methods described elsewhere herein.

At a block 1062, the method 1060 may include inputting, e.g., via the one or more processors, historical claim data into a machine learning algorithm to train the algorithm to develop respective risk profiles for at least one insurable asset based upon a type of the at least one insurable asset and at least one feature or characteristic of the at least one insurable asset, where the at least one insurable asset comprises real property, such as a house or a home. The at least one feature characteristic of the insurable asset may include, for example, at least one of location, square footage, cabinet type, roof type, siding type, type of fireplace, type of windows, or material type, etc. At a block 1065, the method 1060 may include receiving, e.g., via the one or more processors and/or transceivers (such as via wired communication or data transmission, and/or via wireless communication or data transmission over one or more radio links or communication channels), one or more images, such as digital images acquired via a mobile device or smart home controller, of an undamaged insurable asset (such as one or more images submitted by an insured party via a webpage, website, mobile device, and/or smart home controller). Further, at a block 1068, the method 1080 may include inputting, e.g., via the one or more processors, the one or more images of the undamaged insurable asset into a processor having the trained machine learning algorithm installed in a memory unit. The trained machine learning algorithm may, based upon the one or more images, identify or determine a risk profile for the undamaged insurable asset to facilitate generating an insurance quote for the undamaged insurable asset.

In one embodiment (not shown in FIG. 14), the method 1060 may include generating an insurance policy and/or determining an insurance rate for the undamaged insurable asset based at least in part upon the risk profile developed for the undamaged insurable asset. For example, the insurance rate may include a usage-based insurance (UBI) rate. The insurance policy and/or the insurance rate may be electronically transmitted to an owner of the undamaged insurable asset for review and/or approval, which may be provided by the owner electronically, if desired.

Although the present invention has been described in considerable detail with reference to certain preferred versions thereof, other versions are possible, which may include additional or fewer features. For example, additional knowledge may be obtained using identical methods. The labeling techniques described herein may be used in the identification of fraudulent claim activity. The techniques may be used in conjunction with co-insurance to determine the relative risk of pools of customers. External customer features, such as payment histories, may be taken into account in pricing risk. Therefore, the spirit and scope of the appended claims should not be limited to the description of the preferred versions described herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs.

Additionally or alternatively, the machine learning programs may be trained by inputting sample data sets or certain data into the programs, such as drone, autonomous or semi-autonomous drone, image, mobile device, smart or autonomous vehicle, and/or intelligent home, building, and/or real property telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and/or unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart home controller, smart or autonomous vehicle, or other smart devices). In return, the user may be entitled insurance cost savings, including insurance discounts for auto, homeowners, mobile, renters, personal articles, and/or other types of insurance.

In other embodiments, deployment and use of neural network models at a user device (e.g., the client 502 of FIG. 5) may have the benefit of removing any concerns of privacy or anonymity, by removing the need to send any personal or private data to a remote server (e.g., the server 504 of FIG. 5).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for a system and a process of automatically obtaining and/or maintaining insurance coverage through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A real property monitoring system, comprising:
    a plurality of sensors fixedly disposed at respective locations at a building, each sensor monitoring a respective dynamic, physical characteristic associated with the building, and at least some of the plurality of sensors being fixedly attached to the building;
    a user interface via which the real property monitoring system and end-users of the real property monitoring system communicate;
    a data storage entity communicatively connected to the plurality of sensors and storing dynamic characteristic data that is indicative of respective dynamic, physical characteristics detected by the plurality of sensors, the dynamic characteristic data generated based upon signals transmitted by the plurality of sensors;
    a network interface via which third-party input is received by the real property monitoring system, the third-party input including digitized information that is descriptive of an event impacting the building;
    one or more processors; and
    a damage detection module comprising a set of computer-executable instructions stored on one or more memories, wherein the set of computer-executable instructions, when executed by the one or more processors, cause the system to:
        train, by utilizing the third-party input and the dynamic characteristic data corresponding to the building, an analytics model that is predictive of one or more conditions associated with the building;
        apply the trained-analytics model to at least one of the dynamic characteristic data corresponding to the building or additional characteristic data corresponding to the building to thereby discover at least one of the one or more conditions associated with the building, the at least one of the one or more conditions including particular damage to the building that is associated with the event; and
        cause an indication of the particular damage to the building to be transmitted to at least one of a remote computing device or a user interface.

2. The real property monitoring system of claim 1, wherein the dynamic characteristic data is time-series data, and the digitized information descriptive of the event includes one or more timestamps indicative of the occurrence of the event.

3. The real property monitoring system of claim 1, wherein the third-party input includes at least one of digital notes or digital images associated with a file of an insurance claim, the at least one of the digital notes or the digital images generated by an insurance provider corresponding to the insurance claim.

4. The real property monitoring system of claim 3, wherein the at least one of the digital notes or the digital images are generated by at least one of a computing device or system, an adjuster, a call-center representative, an insurance agent, an imaging system, or a drone of the insurance provider.

5. The real property monitoring system of claim 3, wherein a content of the digitized information included in the third-party input is generated by a party that is not associated with the insurance provider and is not an end-user of the real property monitoring system corresponding to the building.

6. The real property monitoring system of claim 1, wherein the third-party input, the dynamic characteristic data corresponding to the building, and data indicative of one or more static characteristics of the building are utilized to train the analytics model.

7. The real property monitoring system of claim 6, wherein the one or more static characteristics of the building include at least one of: a type of the building; a material or product used in construction of the building; or a make, model, and/or year of an appliance inside the building.

8. The real property monitoring system of claim 1, wherein the third-party input, the dynamic characteristic data corresponding to the building, and historical insurance claim data are utilized to train the analytics model.

9. The real property monitoring system of claim 8, wherein the historical insurance claim data includes historical insurance claim data corresponding to one or more other buildings.

10. The real property monitoring system of claim 1, wherein the at least one of the one or more conditions associated with the building further includes a cause of loss corresponding to the particular damage to the building, and an indication of the cause of loss is transmitted to the at least one of the remote computing device or the user interface.

11. A computer-implemented method of detecting damage and other conditions at a building, the method comprising:
monitoring, using a plurality of sensors included in a real property monitoring system, a plurality of dynamic, physical characteristics associated with the building, the plurality of sensors fixedly disposed at respective locations at the building and at least some of the plurality of sensors being fixedly attached to the building;
storing, in a data storage entity included in the real property monitoring system, dynamic characteristic data that is indicative of the plurality of dynamic, physical characteristics associated with the building and monitored by the plurality of sensors, the dynamic characteristic data generated based upon signals transmitted by the plurality of sensors;
obtaining, via a network interface of the real property monitoring system, input whose content is generated by a third-party, the network interface excluded from a set of user interfaces via which end-users of the real property monitoring system communicate with the real-property monitoring system, and the third-party input including digital data that is descriptive of an event impacting the building;
training, by an information processor of the real property monitoring system and by using the third-party input and the dynamic characteristic data of the building, an analytics model that is predictive of one or more conditions associated with the building;
applying, by the information processor, the trained, analytics model to at least one of the dynamic characteristic data corresponding to the building or additional characteristic data corresponding to the building, thereby discovering at least one of the one or more conditions associated with the building, the at least one of the one or more conditions including particular damage to the building that is associated with the event; and
transmitting an indication of the particular damage to the building to at least one of a remote computing device or a user interface.

12. The method of claim 11, wherein obtaining the third-party input descriptive of the event corresponding to the building comprises receiving at least one of digital notes or digital images associated with a file of an insurance claim.

13. The method of claim 12, wherein at least a portion of the at least one of the digital notes or digital images were generated by an insurance provider corresponding to the insurance claim.

14. The method of claim 13, wherein at least another portion of the at least one of the digital notes or digital images were generated by a party other than the insurance provider and other than an end-user of the real property monitoring system.

15. The method of claim 11, wherein training the analytics model by using the third-party input and the dynamic characteristic data of the building comprises training the analytics model by using the third-party input, the dynamic characteristic data of the building, and data indicative of one or more static characteristics of the building.

16. The method of claim 15, wherein the one or more static characteristics of the building include at least one of: a type of the building, a material or product used to construct the building, or a make, model, and/or year of an appliance inside the building.

17. The method of claim 11, wherein training the analytics model by using third-party input and the dynamic characteristic data of the building comprises training the analytics model by using the third-party input, the dynamic characteristic data of the building, and historical insurance claim data.

18. The method of claim 11, wherein the historical insurance claim data includes at least one of: data included in respective files of one or more historical insurance claims corresponding to the building or data included in respective files of one or more historical insurance claims corresponding to another building.

19. The method of claim 11, wherein discovering the at least one of the one or more conditions associated with both the building and the event further includes discovering a cause of loss corresponding to the particular damage associated with the building.

20. The method of claim 11, wherein discovering the cause of loss comprises discovering a new cause of loss that is not included in a set of causes of loss utilized by an insurance provider.

* * * * *